United States Patent
Ma et al.

(10) Patent No.: US 9,608,792 B2
(45) Date of Patent: Mar. 28, 2017

(54) ADAPTIVE FREQUENCY DOMAIN RESOURCE CONFIGURATION METHOD, APPARATUS, AND COMMUNICATIONS SYSTEM

(71) Applicant: Huawei Technologies Co., Ltd., Shenzhen (CN)

(72) Inventors: Ni Ma, Shanghai (CN); Yong Zhao, Shenzhen (CN); Min Huang, Shanghai (CN); Ting Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 14/599,866

(22) Filed: Jan. 19, 2015

(65) Prior Publication Data
US 2015/0139016 A1    May 21, 2015

Related U.S. Application Data

(63) Continuation of application No. PCT/CN2012/078896, filed on Jul. 19, 2012.

(51) Int. Cl.
*H04L 12/66* (2006.01)
*H04L 5/00* (2006.01)
(Continued)

(52) U.S. Cl.
CPC ............ *H04L 5/0057* (2013.01); *H04L 5/006* (2013.01); *H04L 5/0007* (2013.01);
(Continued)

(58) Field of Classification Search
CPC ..... H04L 5/0057; H04L 5/0051; H04L 5/006; H04L 5/0053; H04W 24/08; H04W 72/08
See application file for complete search history.

(56) References Cited

U.S. PATENT DOCUMENTS

| 8,229,448 B2 | 7/2012 | Khan |
| 2005/0207367 A1 | 9/2005 | Onggosanusi et al. |

(Continued)

FOREIGN PATENT DOCUMENTS

| CN | 101079859 A | 11/2007 |
| CN | 101090384 A | 12/2007 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213, V10.6.0, Jun. 2012, 126 pages.
NTT DoCoMo, "Channel-Dependent Packet Scheduling for Single-Carrier FDMA in Evolved UTRA Uplink," TSG-RAN WG1 #43, R1-051390, Nov. 7-11, 2005, 8 pages.
Taha, H.J., et al., "Performance Comparison of Wavelet Packet Transform (WPT) and FFT-OFDM System Based on QAM Modulation Parameters in Fading Channels," WSEAS Transactions on Communication, vol. 9, Issue 8, Aug. 2010, 10 pages.

*Primary Examiner* — Abdelnabi O Musa
(74) *Attorney, Agent, or Firm* — Slater Matsil, LLP

(57) ABSTRACT

Disclosed are an adaptive frequency domain resource configuration method, an apparatus, and a communications system. The method includes receiving, by a receiving apparatus, a pilot signal transmitted by a transmitting apparatus and feeding back channel information of a channel for transmitting the pilot signal to the transmitting apparatus by measuring the pilot signal, so that the transmitting apparatus divides a bandwidth frequency of the transmitting apparatus according to the channel information. The receiving apparatus can feed back the channel information to the transmitting apparatus according to the received pilot signal, so that the transmitting apparatus can divide the bandwidth frequency according to channel quality, and adaptive adjustment can be performed on a frequency domain resource of each subcarrier according to the channel information fed back by the receiving apparatus.

3 Claims, 13 Drawing Sheets

(51) Int. Cl.
*H04W 24/08* (2009.01)
*H04W 72/08* (2009.01)

(52) U.S. Cl.
CPC .......... *H04L 5/0051* (2013.01); *H04L 5/0053* (2013.01); *H04W 24/08* (2013.01); *H04W 72/08* (2013.01)

(56) References Cited

U.S. PATENT DOCUMENTS

| | | | | |
|---|---|---|---|---|
| 2007/0026813 | A1* | 2/2007 | Khan | H04L 1/0026 455/69 |
| 2011/0228689 | A1 | 9/2011 | Wu et al. | |
| 2013/0250788 | A1* | 9/2013 | Kim | H04W 24/10 370/252 |
| 2013/0258874 | A1* | 10/2013 | Khoshnevis | H04L 5/0057 370/252 |

FOREIGN PATENT DOCUMENTS

| | | | |
|---|---|---|---|
| CN | 101223752 | A | 7/2008 |
| CN | 102118867 | A | 7/2011 |
| EP | 2012552 | A1 | 1/2009 |
| JP | 200573259 | A | 3/2005 |
| JP | 200650545 | A | 2/2006 |
| JP | 2006311286 | A | 11/2006 |
| JP | 2011502393 | A | 1/2011 |
| WO | 2008115027 | A1 | 9/2008 |
| WO | 2009058072 | A1 | 5/2009 |

\* cited by examiner

ADAPTIVE FREQUENCY DOMAIN RESOURCE CONFIGURATION METHOD, APPARATUS, AND COMMUNICATIONS SYSTEM

This application is a continuation of International Application No. PCT/CN2012/078896 filed on Jul. 19, 2012, which is hereby incorporated by reference in the entirety.

TECHNICAL FIELD

The present invention relates to the field of communications technologies, and in particular, to an adaptive frequency domain resource configuration method, an apparatus, and a communications system.

BACKGROUND

Orthogonal frequency division multiplexing (OFDM) is a type of multi-carrier modulation technology, and an existing communications system such as long term evolution (LTE) or worldwide interoperability for microwave access (WI-MAX) all use the OFDM technology. M serial signals (where M is a natural number) are input at a transmitter end of the communications system, serial-to-parallel conversion is performed on the M serial signals to output M parallel signals, M parallel signals carried by M subcarriers are output after the M parallel signals are modulated by M submodulators, and the M parallel signals carried by the M subcarriers are configured with a same frequency domain resource, respectively, and are transmitted through M channels. FIG. 1A is a schematic diagram of a subcarrier in a frequency domain in the prior art, where the subcarrier is presented as a sinc spectrum in the frequency domain, a frequency domain bandwidth of the subcarrier is $2\Delta f$, an interval is $\Delta f$, and a corresponding time domain resource $T=1/\Delta f$. As can be seen from the above, the subcarrier in the prior art has a fixed frequency domain resource and a fixed time domain resource.

In an existing communications system, a transmitter end allocates frequency domain resources of a same size to subcarriers according to pre-configuration of the system. FIG. 1B is a schematic diagram of a group of subcarriers in the frequency domain, where five subcarriers are shown. As the system configures the same frequency domain resource for each subcarrier, a fixed frequency bandwidth interval exists between two adjacent subcarriers. As shown in FIG. 1B, the fixed frequency bandwidth interval is $\Delta f$.

During the process of studying the prior art, the inventor finds that, as responses of channels for transmitting subcarriers are different, frequency shifts to different extents may occur on the subcarriers in the transmission process, and amplitudes of the subcarriers may also be attenuated to different extents. When a frequency interval of a fixed size is configured between subcarriers, and particularly when the frequency interval of the fixed size is relatively small, a frequency bandwidth interval between two adjacent subcarriers is also relatively small. Therefore, in the transmission process, the subcarriers may overlap due to frequency shifts, making the system lose orthogonality, and it is difficult for the system to achieve maximum spectrum efficiency, affecting performance of the communications system.

SUMMARY

Embodiments of the present invention provide an adaptive frequency domain resource configuration method, an apparatus, and a communications system, so as to solve the problem in the prior art that a communications system configures a fixed frequency domain resource for each subcarrier, causing low spectrum efficiency of the system and affecting performance of the communications system.

In order to solve the foregoing technical problem, the embodiments of the present invention disclose the following technical solutions.

In one aspect, an adaptive frequency domain resource configuration method is provided. A transmitting apparatus transmits a pilot signal to a receiving apparatus. The transmitting apparatus receives channel information of a channel for transmitting the pilot signal. The channel information is fed back by the receiving apparatus and the channel information is information obtained by the receiving apparatus after measuring the pilot signal. The transmitting apparatus divides a bandwidth frequency of the transmitting apparatus according to the channel information.

In a possible implementation manner, the transmitting, by a transmitting apparatus, a pilot signal to a receiving apparatus includes: transmitting, by the transmitting apparatus, a pilot signal to the receiving apparatus in each pre-divided frequency region, where all frequency regions form the bandwidth frequency of the transmitting apparatus; the receiving, by the transmitting apparatus, channel information of a channel for transmitting the pilot signal, where the channel information is fed back by the receiving apparatus includes: receiving, by the transmitting apparatus, a group of channel quality indicator CQI values of each frequency region, which is fed back by the receiving apparatus, where the group of the CQI values of the frequency region are CQI values measured by the receiving apparatus and corresponding to each frequency resource group of the transmitting apparatus in the frequency region, and frequency resource groups carry the pilot signal through subcarriers of different numbers; and the dividing a bandwidth frequency of the transmitting apparatus according to the channel information includes: acquiring a maximum CQI value from the CQI values corresponding to the frequency resource group; and dividing the frequency region according to the number of subcarriers corresponding to the maximum CQI value.

In another possible implementation manner, the transmitting, by a transmitting apparatus, a pilot signal to a receiving apparatus includes transmitting, by the transmitting apparatus, a wideband pilot signal to the receiving apparatus on the bandwidth frequency; the receiving, by the transmitting apparatus, channel information of a channel for transmitting the pilot signal, where the channel information is fed back by the receiving apparatus after measuring the pilot signal includes receiving, by the transmitting apparatus, a comparison result fed back by the receiving apparatus to the transmitting apparatus after the receiving apparatus measures a channel state information CSI value of a sub pilot signal corresponding to each frequency region and compares the CSI value of the sub pilot signal corresponding to the frequency region with a threshold range, where the sub pilot signal corresponding to the frequency region is a sub pilot signal corresponding to each divided frequency region, which is obtained after the receiving apparatus divides the wideband pilot signal on the bandwidth frequency according to a frequency interval, and each sub pilot signal corresponds to one frequency region on the bandwidth frequency; and the dividing a bandwidth frequency of the transmitting apparatus according to the channel information includes dividing each frequency region of the bandwidth frequency according to the comparison result fed back by the receiving apparatus.

In one aspect, an adaptive frequency domain resource configuration method is provided, where the method includes receiving, by a receiving apparatus, a pilot signal transmitted by a transmitting apparatus; and feeding back, by the receiving apparatus, channel information of a channel for transmitting the pilot signal to the transmitting apparatus by measuring the pilot signal, so that the transmitting apparatus divides a bandwidth frequency of the transmitting apparatus according to the channel information.

In a possible implementation manner, the receiving, by a receiving apparatus, a pilot signal transmitted by a transmitting apparatus includes receiving, by the receiving apparatus, a pilot signal, where the pilot signal is transmitted by the transmitting apparatus in each pre-divided frequency region, and all frequency regions form the bandwidth frequency of the transmitting apparatus; and the feeding back, by the receiving apparatus, channel information of a channel for transmitting the pilot signal to the transmitting apparatus by measuring the pilot signal, so that the transmitting apparatus divides a bandwidth frequency of the transmitting apparatus according to the channel information includes measuring, by the receiving apparatus, CQI values corresponding to each frequency resource group of the transmitting apparatus in each frequency region, where frequency resource groups carry the pilot signal through subcarriers of different numbers; and feeding back, by the receiving apparatus, the CQI values corresponding to the frequency resource group to the transmitting apparatus, so that the transmitting apparatus acquires a maximum CQI value from the CQI values corresponding to the frequency resource group and divides the frequency region according to the number of subcarriers corresponding to the maximum CQI value.

In another possible implementation manner the receiving, by a receiving apparatus, a pilot signal transmitted by a transmitting apparatus includes receiving, by the receiving apparatus, a wideband pilot signal, where the wideband pilot signal is transmitted by the transmitting apparatus on the bandwidth frequency; and the feeding back, by the receiving apparatus, channel information of a channel for transmitting the pilot signal to the transmitting apparatus by measuring the pilot signal, so that the transmitting apparatus divides a bandwidth frequency of the transmitting apparatus according to the channel information includes: dividing, by the receiving apparatus, the wideband pilot signal on the bandwidth frequency according to a frequency interval to obtain a group of sub pilot signals in a frequency domain, where each sub pilot signal corresponds to one frequency region on the bandwidth frequency; measuring, by the receiving apparatus, a channel state information CSI value of a sub pilot signal corresponding to each frequency region; and comparing, by the receiving apparatus, the CSI value of the sub pilot signal corresponding to the frequency region with a threshold range, and feeding back a comparison result to the transmitting apparatus, so that the transmitting apparatus divides the frequency region according to the comparison result.

In another aspect, a transmitting apparatus is provided, including a transmitting unit, configured to transmit a pilot signal to a receiving apparatus; a channel information receiving unit, configured to receive channel information of a channel for transmitting the pilot signal, where the channel information is fed back by the receiving apparatus, and the channel information is information obtained by the receiving apparatus after measuring the pilot signal; and a configuring unit, configured to divide a bandwidth frequency of the transmitting apparatus according to the channel information.

In a possible implementation manner, the transmitting unit includes a first transmitting subunit, configured to transmit a pilot signal to the receiving apparatus in each pre-divided frequency region, where all frequency regions form the bandwidth frequency of the transmitting apparatus; the channel information receiving unit includes a first channel information receiving subunit, configured to receive a group of CQI values of each frequency region, which is fed back by the receiving apparatus, where the group of the CQI values of the frequency region are CQI values measured by the receiving apparatus and corresponding to each frequency resource group of the first transmitting unit in the frequency region, and frequency resource groups carry the pilot signal through subcarriers of different numbers; and the configuring unit includes a CQI acquiring subunit, configured to acquire a maximum CQI value from the CQI values corresponding to the frequency resource group; and a first frequency dividing subunit, configured to divide the frequency region according to the number of subcarriers corresponding to the maximum CQI value acquired by the CQI acquiring subunit.

In another possible implementation manner, the transmitting unit includes:

a second transmitting subunit, configured to transmit a wideband pilot signal to the receiving apparatus on the bandwidth frequency of the transmitting apparatus; the channel information receiving unit includes a second channel information receiving subunit, configured to receive a comparison result fed back by the receiving apparatus to the transmitting apparatus after the receiving apparatus measures a CSI value of a sub pilot signal corresponding to each frequency region and compares the CSI value of the sub pilot signal corresponding to the frequency region with a threshold range, where the sub pilot signal corresponding to the frequency region is a sub pilot signal corresponding to each divided frequency region obtained after the receiving apparatus divides the wideband pilot signal on the bandwidth frequency according to a frequency interval, the wideband pilot signal is transmitted by the second transmitting subunit, and each sub pilot signal corresponds to one frequency region on the bandwidth frequency; and the configuring unit includes a second frequency dividing subunit, configured to divide each frequency region of the bandwidth frequency according to the comparison result fed back by the receiving apparatus and received by the second channel information receiving subunit.

In another aspect, a receiving apparatus includes a pilot signal receiving unit, configured to receive a pilot signal transmitted by a transmitting apparatus; and a feedback unit, configured to feed back channel information of a channel for transmitting the pilot signal to the transmitting apparatus by measuring the pilot signal received by the receiving unit, so that the transmitting apparatus divides a bandwidth frequency of the transmitting apparatus according to the channel information.

In a possible implementation manner, the pilot signal receiving unit includes:

a first pilot signal receiving subunit, configured to receive a pilot signal, where the pilot signal is transmitted by the transmitting apparatus in each pre-divided frequency region, and all frequency regions form the bandwidth frequency of the transmitting apparatus; and the feedback unit includes a CQI measuring subunit, configured to measure CQI values corresponding to each frequency resource group of the transmitting apparatus in each frequency region, where frequency resource groups carry the pilot signal through subcarriers of different numbers; and a CQI feedback subunit, configured to feed back the CQI values measured by the CQI measuring subunit and corresponding to the frequency resource group to the transmitting apparatus, so that the transmitting apparatus acquires a maximum CQI value from the CQI values corresponding to the frequency resource group and divides the frequency region according to the number of subcarriers corresponding to the maximum CQI value.

In another possible implementation manner, the pilot signal receiving unit includes a second pilot signal receiving subunit, configured to receive a wideband pilot signal, where the wideband pilot signal is transmitted by the transmitting apparatus on the bandwidth frequency; and the feedback unit includes a signal dividing subunit, configured to divide the wideband pilot signal on the bandwidth frequency according to a frequency interval, where the wideband pilot signal is received by the second pilot signal receiving subunit, to obtain a group of sub pilot signals in a frequency domain, where each sub pilot signal corresponds to one frequency region on the bandwidth frequency; a CSI measuring subunit, configured to measure a CSI value of a sub pilot signal corresponding to each frequency region divided by the signal dividing subunit; and a result feedback subunit, configured to compare the CSI value of the sub pilot signal corresponding to the frequency region with a threshold range, where the CSI value is measured by the CSI measuring subunit, and feed back a comparison result to the transmitting apparatus, so that the transmitting apparatus divides the frequency region according to the comparison result.

In still another aspect, a communications system is provided and includes: a transmitting apparatus and a receiving apparatus, where the transmitting apparatus is configured to transmit a pilot signal to the receiving apparatus; the receiving apparatus is configured to feed back channel information of a channel for transmitting the pilot signal to the transmitting apparatus by measuring the pilot signal; and the transmitting apparatus is further configured to divide a bandwidth frequency of the transmitting apparatus according to the channel information.

In a possible implementation manner, the transmitting apparatus is specifically configured to transmit a pilot signal to the receiving apparatus in each pre-divided frequency region, where all frequency regions form the bandwidth frequency of the transmitting apparatus; the receiving apparatus is specifically configured to measure CQI values corresponding to each frequency resource group of the transmitting apparatus in each frequency region, where frequency resource groups carry the pilot signal through subcarriers of different numbers, and feed back the CQI values corresponding to the frequency resource group to the transmitting apparatus, so that the transmitting apparatus acquires a maximum CQI value from the CQI values corresponding to the frequency resource group, and divides the frequency region according to the number of subcarriers corresponding to the maximum CQI value; and the transmitting apparatus is specifically further configured to acquire the maximum CQI value from the CQI values corresponding to the frequency resource group, and divide the frequency region according to the number of the subcarriers corresponding to the maximum CQI value.

In another possible implementation manner, the transmitting apparatus is specifically configured to transmit a wideband pilot signal to the receiving apparatus on the bandwidth frequency; the receiving apparatus is specifically configured to divide the wideband pilot signal on the bandwidth frequency according to a frequency interval to obtain a group of sub pilot signals in a frequency domain, where each sub pilot signal corresponds to one frequency region on the bandwidth frequency; and compare the CSI value of the sub pilot signal corresponding to the frequency region with a threshold range, and feed back a comparison result to the transmitting apparatus; and the transmitting apparatus is specifically further configured to divide each frequency region of the bandwidth frequency according to the comparison result fed back by the receiving apparatus.

In yet another aspect, a transmitting apparatus is provided, including a radio transmitter, configured to transmit a pilot signal to a receiving apparatus; and a processor, configured to: after receiving channel information of a channel for transmitting the pilot signal, where the channel information is fed back by the receiving apparatus, divide a bandwidth frequency of the transmitting apparatus according to the channel information, where the channel information is information obtained by the receiving apparatus after measuring the pilot signal.

In a possible implementation manner, the radio transmitter is specifically configured to transmit a pilot signal to the receiving apparatus in each pre-divided frequency region, where all frequency regions form the bandwidth frequency of the transmitting apparatus; and the processor is specifically configured to receive a group of CQI values of each frequency region, CQI values corresponding to each frequency resource group in the frequency region, and the frequency resource group, which are fed back by the receiving apparatus, acquire a maximum CQI value from the group of the CQI values corresponding to the frequency resource group, and divide the frequency region according to the number of subcarriers corresponding to the maximum CQI value.

In another possible implementation manner, the radio transmitter is specifically configured to transmit a wideband pilotsignal to the receiving apparatus on the bandwidth frequency; and the processor is specifically configured to receive a comparison result fed back by the receiving apparatus to the transmitting apparatus after the receiving apparatus measures a CSI value of a sub pilot signal corresponding to each frequency region and compares the CSI value of the sub pilot signal corresponding to the frequency region with a threshold range, where the sub pilot signal corresponding to the frequency region is a sub pilot signal corresponding to each divided frequency region obtained after the receiving apparatus divides the wideband pilot signal on the bandwidth frequency according to a frequency interval, and each sub pilot signal corresponds to one frequency region on the bandwidth frequency; and divide each frequency region of the bandwidth frequency according to the comparison result fed back by the receiving apparatus.

In yet another aspect, a receiving apparatus is provided, where the receiving apparatus includes a radio receiver, configured to receive a pilot signal transmitted by a transmitting apparatus; and a processor, configured to feed back channel information of a channel for transmitting the pilot signal to the transmitting apparatus by measuring the pilot signal, so that the transmitting apparatus divides a bandwidth frequency of the transmitting apparatus according to the channel information.

In a possible implementation manner, the radio receiver is specifically configured to receive a pilot signal, where the pilot signal is transmitted by the transmitting apparatus in each pre-divided frequency region, and all frequency regions form the bandwidth frequency of the transmitting apparatus; and the processor is specifically configured to measure CQI values corresponding to each frequency resource group of the transmitting apparatus in each frequency region, where frequency resource groups carry the pilot signal through subcarriers of different numbers, and feed back the CQI values corresponding to the frequency resource group to the transmitting apparatus, so that the transmitting apparatus acquires a maximum CQI value from the CQI values corresponding to the frequency resource group and divides the frequency region according to the number of subcarriers corresponding to the maximum CQI value.

In another possible implementation manner, the radio receiver is specifically configured to receive a wideband pilot signal, where the wideband pilot signal is transmitted by the transmitting apparatus on the bandwidth frequency; and the processor is specifically configured to divide the wideband pilot signal on the bandwidth frequency according to a frequency interval to obtain a group of sub pilot signals in a frequency domain, where each sub pilot signal corresponds to one frequency region on the bandwidth frequency, measure a channel state information CSI value of a sub pilot signal corresponding to each frequency region, compare the CSI value of the sub pilot signal corresponding to the frequency region with a threshold range, and feed back a comparison result to the transmitting apparatus, so that the transmitting apparatus divides the frequency region according to the comparison result.

In the embodiments of the present invention, a transmitting apparatus transmits a pilot signal to a receiving apparatus, the receiving apparatus feeds back channel information of a channel for transmitting the pilot signal to the transmitting apparatus by measuring the pilot signal, and the transmitting apparatus divides a bandwidth frequency according to the channel information. In the embodiments of the present invention, the receiving apparatus can feed back the channel information to the transmitting apparatus according to the received pilot signal, so that the transmitting apparatus can divide the bandwidth frequency according to channel quality, and adaptive adjustment can be performed on a frequency domain resource of each subcarrier according to the channel information fed back by the receiving apparatus, so that the frequency efficiency of the system can be improved, and the performance of the communications system can be ensured.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following embodiments of the present invention provide an adaptive frequency domain resource configuration method, an apparatus, and a communications system.

In the embodiments of the present invention, a receiving apparatus measures a received pilot signal, and feeds back measured channel information to a transmitting apparatus, so that the transmitting apparatus adaptively divides a frequency domain resource according to the channel information. In comparison with the prior art, a fixed frequency domain resource is no longer allocated to each subcarrier; the receiving apparatus can adaptively configure a frequency domain resource for a subcarrier according to the channel information fed back by the transmitting apparatus, so as to maximize a spectrum utilization rate on each subcarrier. Therefore, compared with an existing manner of configuring a fixed frequency domain resource for each subcarrier, spectrum efficiency of the communications system can be improved effectively.

Furthermore, in the embodiments of the present invention, for uplink transmission, the transmitting apparatus may be set on a terminal side, and the receiving apparatus may be set on a base station side; for downlink transmission, the transmitting apparatus may be set on a base station side, and the receiving apparatus may be set on a terminal side.

In addition, the communications system in the embodiments of the present invention no longer allocates a fixed frequency domain resource to each subcarrier. For example, frequency domain resources of non-identical sizes may be allocated to subcarriers, that is, unequal division may be performed on frequency domain resources. Correspondingly, unequal division may also be performed on time domain resources according to a reciprocal relationship between frequency domain resources and time domain resources. That is, the subcarriers may serve on frequency domain resources and time domain resources of different resolutions, where for a time frequency resource allocated to each subcarrier, when a resolution of the resource in a frequency domain is increased, the resolution of the resource in a time domain is correspondingly reduced. Conversely, when the resolution of the resource in the frequency domain is reduced, the resolution of the resource in the time domain is correspondingly increased.

To make the technical solutions in the embodiments of the present invention more comprehensible for a person skilled in the art, and make the foregoing objectives, features, and advantages of the embodiments of the present invention more clear, the following further describes the technical solutions in the embodiments of the present invention in detail with reference to the accompanying drawings.

Figure 1A:
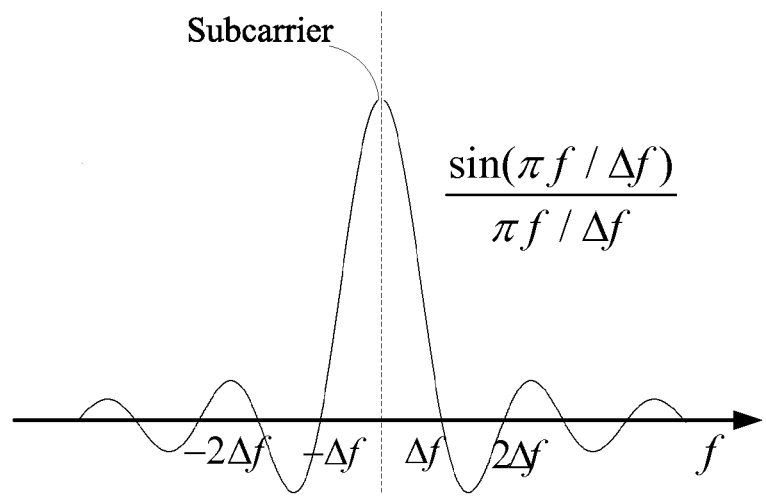
FIG. 1A is a schematic diagram of a subcarrier in a frequency domain in the prior art.
Figure 1B:
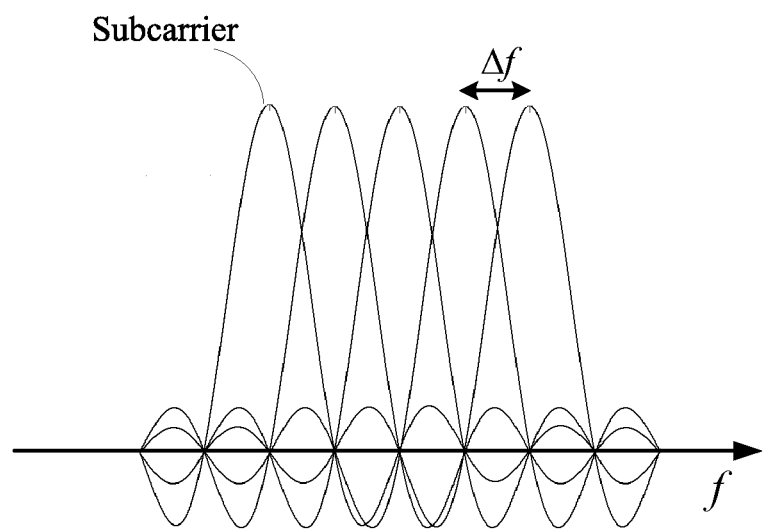
FIG. 1B is a schematic diagram of a group of subcarriers in a frequency domain in the prior art.
Figure 2A:
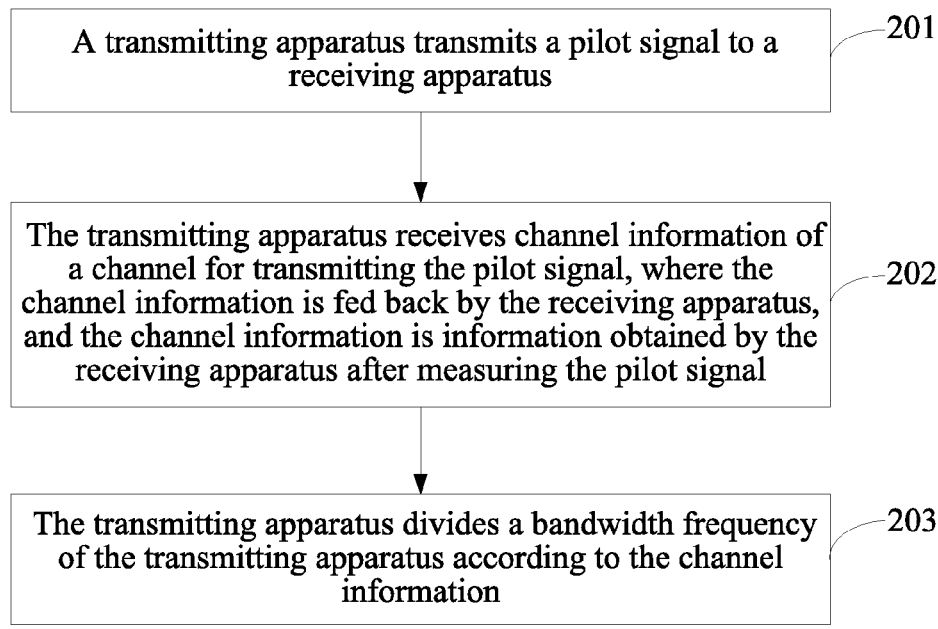
FIG. 2A is a flow chart of an adaptive frequency domain resource configuration method according to an embodiment of the present invention.

Referring to FIG. 2A, FIG. 2A is a flow chart of an adaptive frequency domain resource configuration method according to another embodiment of the present invention. In this embodiment, a frequency domain resource configuration process is described from a sending apparatus side in a communications system.

Step 201. A transmitting apparatus transmits a pilot signal to a receiving apparatus.

The transmitting apparatus may transmit the pilot signal in the following two manners.

In a first manner, the transmitting apparatus transmits a pilot signal to the receiving apparatus in each pre-divided frequency region, where all frequency regions form a bandwidth frequency of the transmitting apparatus.

In an optional embodiment of the first manner, the transmitting apparatus may transmit N group of pilot signals in each frequency region according to N frequency resource groups, where N is a natural number. The N frequency resource groups are groups obtained by the transmitting apparatus by dividing the frequency region according to different numbers of subcarriers, and a subcarrier in each frequency resource group is used for carrying a group of pilot signals, where the number of subcarriers in each frequency resource group may be the same as the number of pilot signals in each group of pilot signals, and in this case, each subcarrier carries one pilot signal.

Figure 2B:
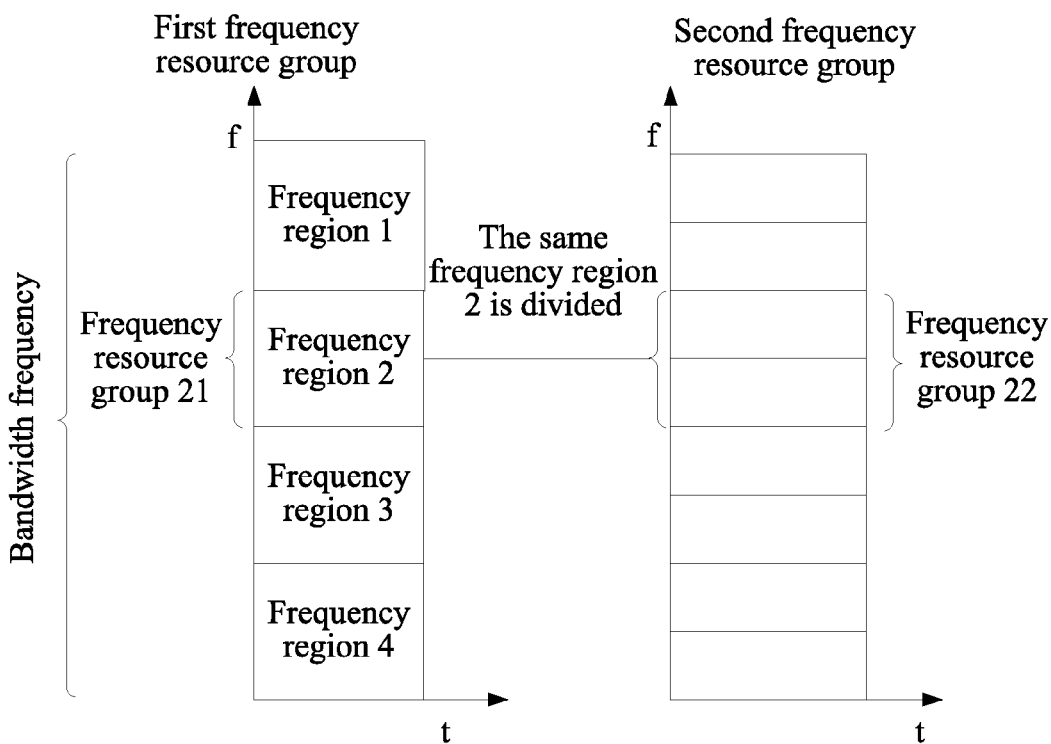
FIG. 2B is a schematic diagram of frequency resource group division where an embodiment of the present invention is applied.

Referring to FIG. 2B, FIG. 2B is a schematic diagram of frequency resource group division where the foregoing embodiment is applied.

FIG. 2B is described by taking an example where each frequency region is divided into two frequency resource groups. In FIG. 2B, the whole bandwidth frequency is divided into four frequency regions, which are a frequency region 1, a frequency region 2, a frequency region 3, and a frequency region 4 respectively. By taking the frequency region 2 as an example, it is assumed that the frequency region 2 is divided into two frequency resource groups according to different numbers of subcarriers, where a first frequency resource group is a frequency resource group 21 that includes the whole frequency region 2, and the frequency resource group 21 corresponds to transmitting one subcarrier; a second frequency resource group is a frequency resource group 22 that divides the frequency region 2 into including two subareas, and the frequency resource group 22 corresponds to transmitting two subcarriers. In the frequency resource grouping manner shown in FIG. 2B, by still taking the frequency region 2 as an example, the transmitting apparatus transmits two groups of pilot signals in the frequency region 2, where a first group of pilot signals corresponds to the frequency resource group 21, and one pilot signal is carried by one subcarrier; a second group of pilot signals corresponds to the frequency resource group 22, and two pilot signals are carried by two subcarriers.

In another optional embodiment of the first manner, the transmitting apparatus transmits one group of pilot signals in each frequency region through a subcarrier included in a first frequency resource group, where the first frequency resource group is a frequency resource group with a maximum number of carriers in N frequency resource groups obtained by the transmitting apparatus by dividing the frequency region according to different numbers of subcarriers. The number of pilot signals in a group of pilot signals corresponding to the first frequency resource group may be consistent with the number of subcarriers in the first frequency resource group.

As can be seen with reference to the description of FIG. 2B, when the frequency region of the transmitting apparatus is divided into frequency resource groups according to FIG. 2B, where the frequency region 2 is still taken as an example. The frequency region 2 is divided into two frequency resource groups, and the frequency resource group 22 corresponds to including two subcarriers, while the frequency resource group 21 corresponds to including one subcarrier. Therefore, the frequency resource group 22 is the first frequency resource group in the frequency region 2.

In a second manner, the transmitting apparatus transmits a wideband pilot signal to the receiving apparatus on the bandwidth frequency. In the first manner above, the whole bandwidth frequency is divided into several frequency regions, each frequency region may further be divided into different frequency resource groups, and the frequency resource groups carry a pilot signal through subcarriers of different numbers, while in the second manner, the wideband pilot signal may be a pilot signal that occupies the whole bandwidth frequency and is transmitted through one subcarrier.

Step 202. The transmitting apparatus receives channel information of a channel for transmitting the pilot signal, where the channel information is fed back by the receiving apparatus, and the channel information is information obtained by the receiving apparatus after measuring the pilot signal.

When the transmitting apparatus transmits the pilot signal in the first manner in step 201, the transmitting apparatus receives a group of channel quality indicator (channel quality indicator, CQI) values of each frequency region, which is fed back by the receiving apparatus, where the group of the CQI values of the frequency region are CQI values measured by the receiving apparatus and corresponding to each frequency resource group of the transmitting apparatus in the frequency region, and frequency resource groups carry the pilot signal through subcarriers of different numbers.

When the transmitting apparatus transmits the pilot signal in the second manner in step 201, the transmitting apparatus receives a comparison result fed back by the receiving apparatus to the transmitting apparatus after the receiving apparatus measures a channel state information (CSI) value of a sub pilot signal corresponding to each frequency region and compares the CSI value of the sub pilot signal corresponding to the frequency region with a threshold range, where the sub pilot signal corresponding to the frequency region is a sub pilot signal corresponding to each divided frequency region obtained after the receiving apparatus divides the wideband pilot signal on the bandwidth frequency according to a frequency interval.

Step 203. The transmitting apparatus divides the bandwidth frequency of the transmitting apparatus according to the channel information.

When the transmitting apparatus transmits the pilot signal in the first manner in step 201, the transmitting apparatus acquires a maximum CQI value from the group of the CQI values corresponding to the frequency resource group, and divides the frequency region according to the number of subcarriers corresponding to the maximum CQI value.

When the transmitting apparatus transmits the pilot signal in the second manner in step 201, the transmitting apparatus divides each frequency region of the bandwidth frequency according to the comparison result fed back by the receiving apparatus.

As can be seen from the foregoing embodiment, the receiving apparatus can feed back channel information to the transmitting apparatus according to a received pilot signal, so that the transmitting apparatus can divide a bandwidth frequency according to channel quality, and adaptive adjustment can be performed on a frequency domain resource of each subcarrier according to the channel information fed back by the receiving apparatus, so that the frequency efficiency of the system can be improved, and the performance of the communications system can be ensured.

Figure 3:
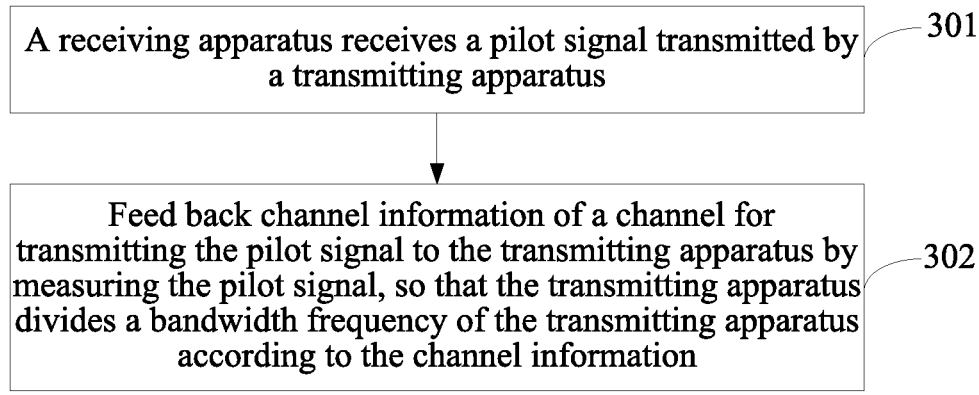
FIG. 3 is a flow chart of an adaptive frequency domain resource configuration method according to another embodiment of the present invention.

Referring to FIG. 3, FIG. 3 is a flow chart of an adaptive frequency domain resource configuration method according to an embodiment of the present invention. In this embodiment, a frequency domain resource configuration process is described from a receiving apparatus side in a communications system.

Step 301. A receiving apparatus receives a pilot signal transmitted by a transmitting apparatus.

In the embodiment of the present invention, the pilot signal transmitted by the transmitting apparatus is a signal transmitted before a data signal and used for measuring channel information.

In this embodiment, the receiving apparatus may receive the pilot signal transmitted in the following two manners by the transmitting apparatus.

In a first manner, the receiving apparatus receives a pilot signal, where the pilot signal is transmitted by the transmitting apparatus in each pre-divided frequency region, and all frequency regions form a bandwidth frequency of the transmitting apparatus.

In a second manner, the receiving apparatus receives a wideband pilot signal, where the wideband pilot signal is transmitted by the transmitting apparatus on the bandwidth frequency of the transmitting apparatus.

Step 302. Feed back channel information of a channel for transmitting the pilot signal to the transmitting apparatus by measuring the pilot signal, so that the transmitting apparatus divides the bandwidth frequency of the transmitting apparatus according to the channel information.

When the receiving apparatus receives the pilot signal in the first manner in step 301, the receiving apparatus may measure a CQI value corresponding to each frequency resource group in each frequency region, where frequency resource groups carry the pilot signal through subcarriers of different numbers; and feed back CQI values corresponding to the frequency resource groups to the transmitting apparatus, so that the transmitting apparatus acquires a maximum CQI value from the group of the CQI values, and divides the frequency region according to the number of subcarriers corresponding to the maximum CQI value, where each divided subarea corresponds to one subcarrier.

When the receiving apparatus receives the pilot signal in the second manner in step 301, the receiving apparatus divides the wideband pilot signal on the bandwidth frequency according to a frequency interval to obtain a group of sub pilot signals in a frequency domain, where each sub pilot signal corresponds to one frequency region on the bandwidth frequency; measures a CSI value of a sub pilot signal corresponding to each frequency region; and compares the CSI value of the sub pilot signal corresponding to the frequency region with a threshold range, and feeds back a comparison result to the transmitting apparatus, so that the transmitting apparatus divides the frequency region according to the comparison result.

After the receiving apparatus feeds back the measured channel information to the transmitting apparatus, the transmitting apparatus may divide the bandwidth frequency according to the channel information, so that the transmitting apparatus can configure different frequency domain resources for corresponding subcarriers according to channel information of different channels, and when a regular data signal is transmitted, the signal is carried by the subcarriers allocated with different frequency domain resources, so as to maximize the spectrum efficiency.

As can be seen from the foregoing embodiment, a receiving apparatus can feed back channel information to a transmitting apparatus according to a received pilot signal, so that the transmitting apparatus can divide a bandwidth frequency according to channel quality. As sizes of divided frequency domain resources may be different, adaptive adjustment can be performed on a frequency domain resource of each subcarrier according to the channel information fed back by the receiving apparatus, so that the frequency efficiency of the system can be improved, and the performance of the communications system can be ensured.

Figure 4:
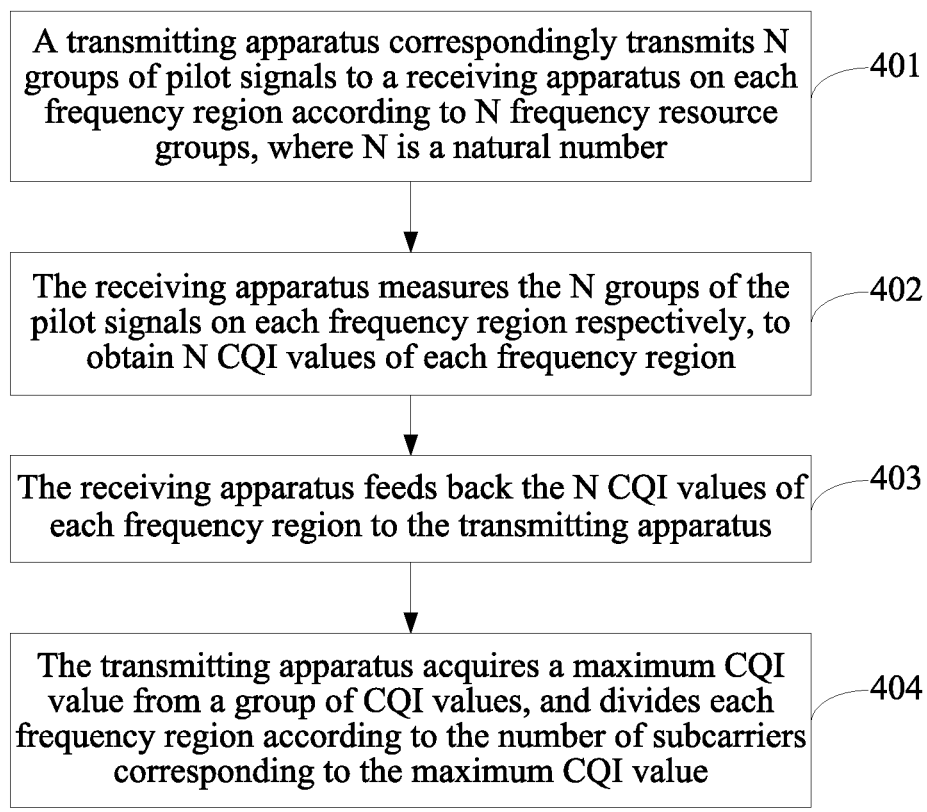
FIG. 4 is a flow chart of an adaptive frequency domain resource configuration method according to another embodiment of the present invention.

FIG. 4 is a flow chart of an adaptive frequency domain resource configuration method according to another embodiment of the present invention. In this embodiment, a frequency domain resource configuration process performed by measuring a CQI value is described.

Step 401. A transmitting apparatus correspondingly transmits N groups of pilot signals to a receiving apparatus in each frequency region according to N frequency resource groups, where N is a natural number.

The N frequency resource groups are groups obtained by the transmitting apparatus by dividing the frequency region according to different numbers of subcarriers, and a subcarrier in each frequency resource group is used for carrying a group of pilot signals, where the number of subcarriers in each frequency resource group may be the same as the number of pilot signals in each group of pilot signals, and in this case, each subcarrier carries one pilot signal.

Referring to FIG. 2B still, FIG. 2B is a schematic diagram of frequency resource group division where this embodiment is applied.

FIG. 2B is described by taking an example where each frequency region is divided into two frequency resource groups. In FIG. 2B, the whole bandwidth frequency is divided into four frequency regions, which are a frequency region 1, a frequency region 2, a frequency region 3, and a frequency region 4, respectively. By taking the frequency region 2 as an example, it is assumed that the frequency region 2 is divided into two frequency resource groups according to pilot configuration, where one of the frequency resource groups is a frequency resource group 21 that includes the whole frequency region 2, and the frequency resource group 21 corresponds to transmitting one subcarrier; the other frequency resource group is a frequency resource group 22 that divides the frequency region 2 into two subareas, and the frequency resource group 22 corresponds to transmitting two subcarriers.

In the frequency resource grouping manner shown in FIG. 2B, by still taking the frequency region 2 as an example, the transmitting apparatus transmits two groups of pilot signals in the frequency region 2, where the first group of pilot signals corresponds to the frequency resource group 21, and one pilot signal is carried by one subcarrier; the second group of pilot signals corresponds to the frequency resource group 22, and two pilot signals are carried by two subcarriers.

Step 402. The receiving apparatus measures the N groups of the pilot signals in each frequency region, respectively, to obtain N CQI values of each frequency region.

Corresponding to each frequency region, the receiving apparatus receives N groups of pilot signals. Description is made by still taking the frequency region 2 in FIG. 2B as an example. The receiving apparatus receives two groups of pilot signals, performs CQI measurement on a first group of pilot signals to obtain a CQI value when one pilot signal is carried by one subcarrier in the frequency region 2, where the CQI value is called a first CQI value; and performs CQI measurement on two pilot signals in a second group of pilot signals, respectively, to obtain two CQI values, and may further obtain a CQI value when two pilot signals are carried by two subcarriers in the frequency region 2, where the CQI value is called a second CQI value, and the second CQI value may be a sum of the two CQI values obtained after the CQI measurement is performed on the two pilot signals in the second group of the pilot signals, respectively.

Step 403. The receiving apparatus feeds back the N CQI values of each frequency region to the transmitting apparatus.

In each frequency region, corresponding to the number of frequency resource groups, a group of CQI values is obtained, where the number of the CQI values is the same as the number of the frequency resource groups. By still taking the frequency region 2 in FIG. 2B as an example, the receiving apparatus uses a measured first CQI value corresponding to the frequency resource group 21 and a second CQI value corresponding to the frequency resource group 22 as a group of CQI values of the frequency region 2, and feeds back the group of the CQI values to the transmitting apparatus. Furthermore, the receiving apparatus may also first sort the first CQI value and the second CQI value in a descending order, and then feed back the first CQI value and the second CQI value that are sorted in a descending order to the transmitting apparatus.

Step 404. The transmitting apparatus acquires a maximum CQI value from the group of the CQI values, and divides each frequency region according to the number of subcarriers corresponding to the maximum CQI value.

After receiving the group of the CQI values of the frequency region 2, the transmitting apparatus obtains a maximum CQI value from the first CQI value and the second CQI value, and divides a second frequency region according to the number of carriers corresponding to the maximum CQI value. Assuming that the second CQI value is larger than the first CQI value, the transmitting apparatus divides the frequency region 2 according to the number of subcarriers of the frequency resource group 22 during subsequent data signal transmission, that is, divides the frequency region 2 into two subareas, and each subarea corresponds to transmitting one subcarrier, that is, configures the frequency region 2 for the two subcarriers of the frequency resource group 22 according to a division result, and a transmitted data signal is subsequently carried by the two subcarriers in the frequency region 2.

It should be noted that, in this embodiment, for ease of illustration, description is made by taking an example where each frequency resource is divided into two frequency resource groups; in actual applications, each frequency region 2 may be divided into more than two frequency resource groups, which is not limited in this embodiment.

As can be seen from the foregoing embodiment, a receiving apparatus can feed back, according to a received pilot signal, different CQI values when the pilot signal is carried by subcarriers of different numbers in each frequency region to a transmitting apparatus, so that the transmitting apparatus can divide the frequency region according to a maximum CQI value in a group of CQI values corresponding to the frequency region; as division manners for frequency domain regions may be different, the numbers of subcarriers corresponding to the frequency regions may also be different, that is, frequency domain resources configured for subcarriers on the whole bandwidth frequency are different, adaptive adjustment can be performed on the frequency domain resources of the subcarriers according to CQI values fed back by the receiving apparatus, so that the frequency efficiency of the system can be improved, and the performance of the communications system can be ensured.

Figure 5:
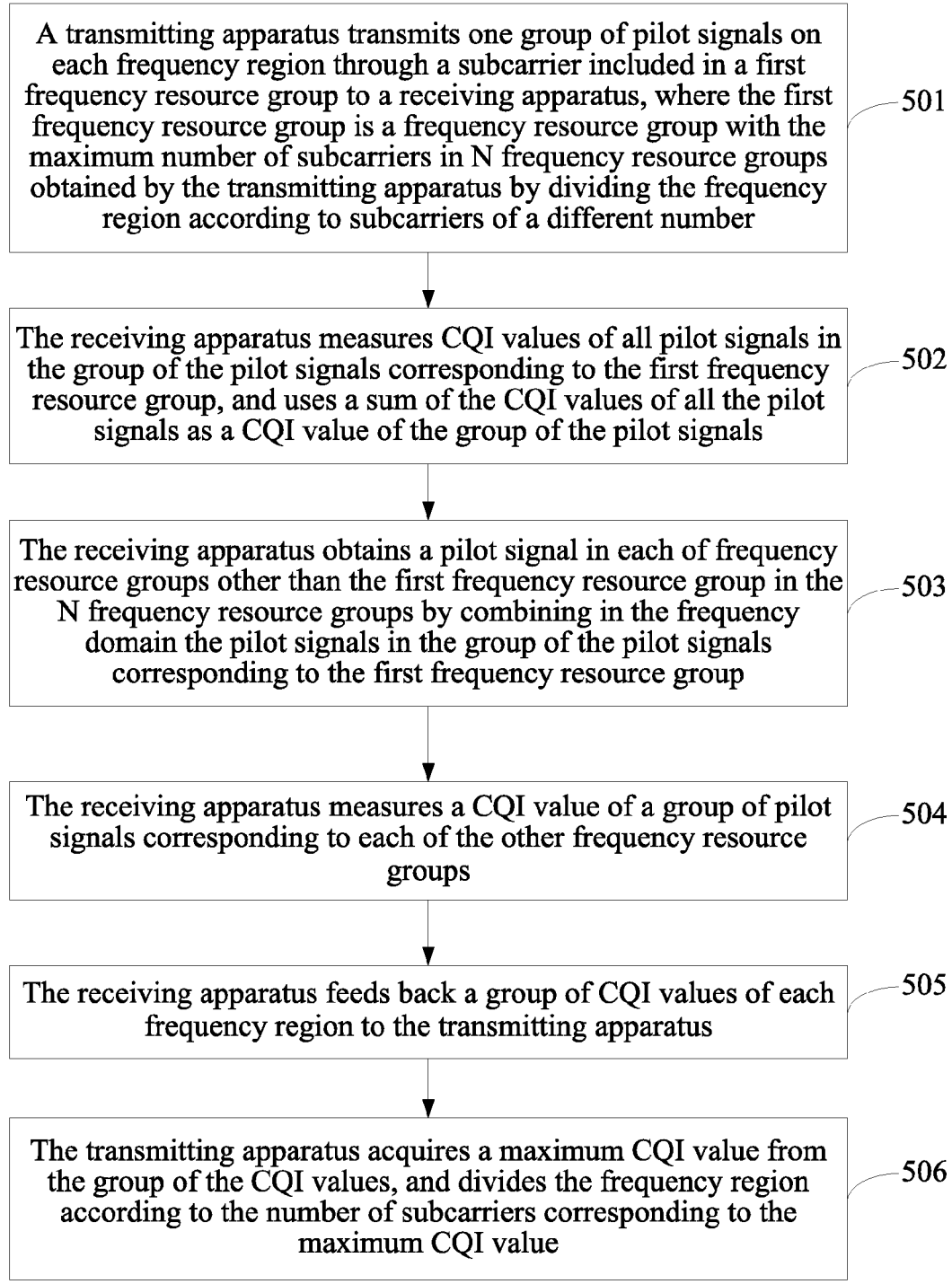
FIG. 5 is a flow chart of an adaptive frequency domain resource configuration method according to another embodiment of the present invention.

Referring to FIG. 5, FIG. 5 is a flow chart of an adaptive frequency domain resource configuration method according to another embodiment of the present invention. In this embodiment, another frequency domain resource configuration process performed by measuring a CQI value is described.

Step 501. A transmitting apparatus transmits one group of pilot signals in each frequency region through a subcarrier included in a first frequency resource group to a receiving apparatus, where the first frequency resource group is a frequency resource group with a maximum number of carriers in N frequency resource groups obtained by the transmitting apparatus by dividing the frequency region according to different numbers of subcarriers.

The number of pilot signals in a group of pilot signals corresponding to the first frequency resource group may be consistent with the number of subcarriers in the first frequency resource group.

As can be seen with reference to the description of FIG. 2B, when the frequency region of the transmitting apparatus is divided into frequency resource groups according to FIG. 2B, where the frequency region 2 is still taken as an example, the frequency region 2 is divided into two frequency resource groups, and the frequency resource group 22 corresponds to including two subcarriers, while the frequency resource group 21 corresponds to including one subcarrier. Therefore, the frequency resource group 22 is the first frequency resource group in the frequency region 2.

The difference between this embodiment and the embodiment shown in FIG. 4 lies in that, on the transmitting apparatus side, in this embodiment, only one group of pilot signals need to be transmitted in each frequency region according to the first frequency resource group. As can be seen with reference to the frequency region 2 in FIG. 2B, the frequency resource group 22 serves as the first frequency resource group of the frequency region 2, and the transmitting apparatus only needs to transmit two pilot signals that are carried by two subcarriers, thereby saving pilot overhead of the system.

Step 502. The receiving apparatus measures CQI values of all pilot signals in the group of the pilot signals corresponding to the first frequency resource group, and uses a sum of the CQI values of all the pilot signals as a CQI value of the group of the pilot signals.

This step is consistent with step 302 in description. When obtaining a CQI value of the group of the pilot signals corresponding to the first frequency resource group, the receiving apparatus may measure all the CQI values of all the pilot signals in the group of the pilot signals, and then add the CQI values of all the pilot signals to obtain a CQI value as the CQI value of the group of the pilot signals.

Step 503. The receiving apparatus obtains a pilot signal in each of frequency resource groups other than the first frequency resource group in the N frequency resource groups by combining in a frequency domain the pilot signals in the group of the pilot signals corresponding to the first frequency resource group.

By still taking the frequency region 2 in FIG. 2B as an example, the frequency resource group 22 is the first frequency resource group in the frequency region 2. After receiving a group of pilot signals corresponding to the frequency resource group 22, the receiving apparatus may obtain a group of pilot signals corresponding to the frequency resource group 21 by combining two pilot signals in the group of the pilot signals in the frequency domain, where the group of the pilot signals includes one pilot signal.

The foregoing description is merely exemplary. When each frequency region includes more than two frequency resource groups, assuming that m frequency resource groups are included, the frequency resource groups are represented by Ki, where a value of i ranges from 1 to m, and m is a natural number. Assuming that the first frequency resource group is Km, pilot signals in all other frequency resource groups Ki other than the first frequency resource group are all obtained by combining pilot signals in a frequency resource group Ki+1 in the frequency domain.

Step 504. The receiving apparatus measures a CQI value of a group of pilot signals corresponding to each of the other frequency resource groups.

After each of the other frequency resource groups is obtained, a process of measuring a CQI value of each group of pilot signals corresponding to each frequency resource group is consistent with that of step 402, which is not described herein again.

Step 505. The receiving apparatus feeds back a group of CQI values of each frequency region to the transmitting apparatus.

In each frequency region, corresponding to the number of frequency resource groups, a group of CQI values is obtained, where the number of CQI values is the same as the number of the frequency resource groups. By still taking the frequency region 2 in FIG. 2B as an example, the receiving apparatus uses the measured first CQI value corresponding to the frequency resource group 21 and the second CQI value corresponding to the frequency resource group 22 as a group of CQI values of the frequency region 2, and feeds back the group of the CQI values to the transmitting apparatus. Furthermore, the receiving apparatus may first sort the first CQI value and the second CQI value in a descending order, and then feed back the first CQI value and the second CQI value to the transmitting apparatus according to the order.

Step 506. The transmitting apparatus acquires a maximum CQI value from the group of the CQI values, and divides the frequency region according to the number of subcarriers corresponding to the maximum CQI value.

After receiving the group of the CQI values of the frequency region 2, the transmitting apparatus obtains a maximum CQI value from the first CQI value and the second CQI value, and divides a second frequency region according to the number of carriers corresponding to the maximum CQI value. Assuming that the second CQI value is larger than the first CQI value, the transmitting apparatus divides the frequency region 2 according to the frequency resource group 22 during subsequent data signal transmission, that is, configures the frequency region 2 for two subcarriers, and a transmitted data signal is subsequently carried by the two subcarriers in the frequency region 2.

As can be seen from the foregoing embodiment, a receiving apparatus can feed back, according to a received pilot signal, different CQI values when the pilot signal is carried by subcarriers of different numbers in each frequency region to a transmitting apparatus, so that the transmitting apparatus can divide the frequency region according to a maximum CQI value in a group of CQI values corresponding to the frequency region; as division manners for frequency domain regions may be different, the numbers of subcarriers corresponding to the frequency regions may also be different, that is, frequency domain resources configured for subcarriers on the whole bandwidth frequency are different, and adaptive adjustment can be performed on the frequency domain resources of the subcarriers according to CQI values fed back by the receiving apparatus, so that the frequency efficiency of the system can be improved, and the performance of the communications system can be ensured. Moreover, only one group of pilot signals is transmitted for each frequency region in the embodiment, so that the pilot overhead of the system can be further reduced.

Figure 6A:
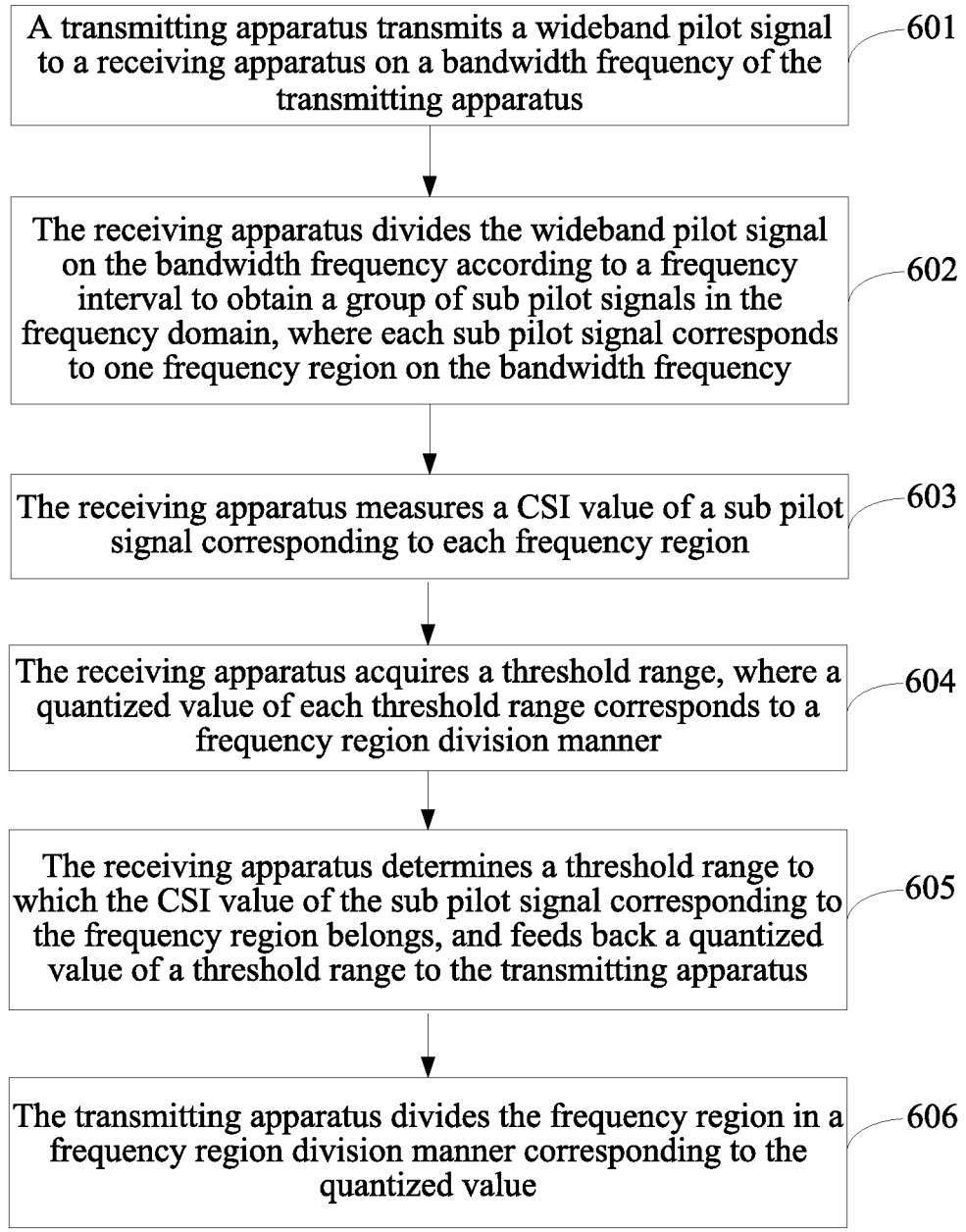
FIG. 6A is a flow chart of an adaptive frequency domain resource configuration method according to another embodiment of the present invention.

Referring to FIG. 6A, FIG. 6A is a flow chart of an adaptive frequency domain resource configuration method according to another embodiment of the present invention. In this embodiment, a frequency domain resource configuration process performed by measuring a CSI value is described.

Step 601. A transmitting apparatus transmits a wideband pilot signal to a receiving apparatus on a bandwidth frequency of the transmitting apparatus.

Step 602. The receiving apparatus divides the wideband pilot signal on the bandwidth frequency according to a frequency interval to obtain a group of sub pilot signals in a frequency domain, where each sub pilot signal corresponds to one frequency region on the bandwidth frequency.

When the transmitting apparatus transmits one wideband pilot signal on the whole bandwidth frequency, on the transmitting apparatus side, pilot signals on all frequency points have the same energy, after the wideband pilot signal is transmitted to the receiving apparatus through a radio channel, as pilot signals on different frequency points undergo different multi-path fading in the transmission process, the pilot signal received by the receiving apparatus has different energy fading on different frequency points.

Figure 6B:
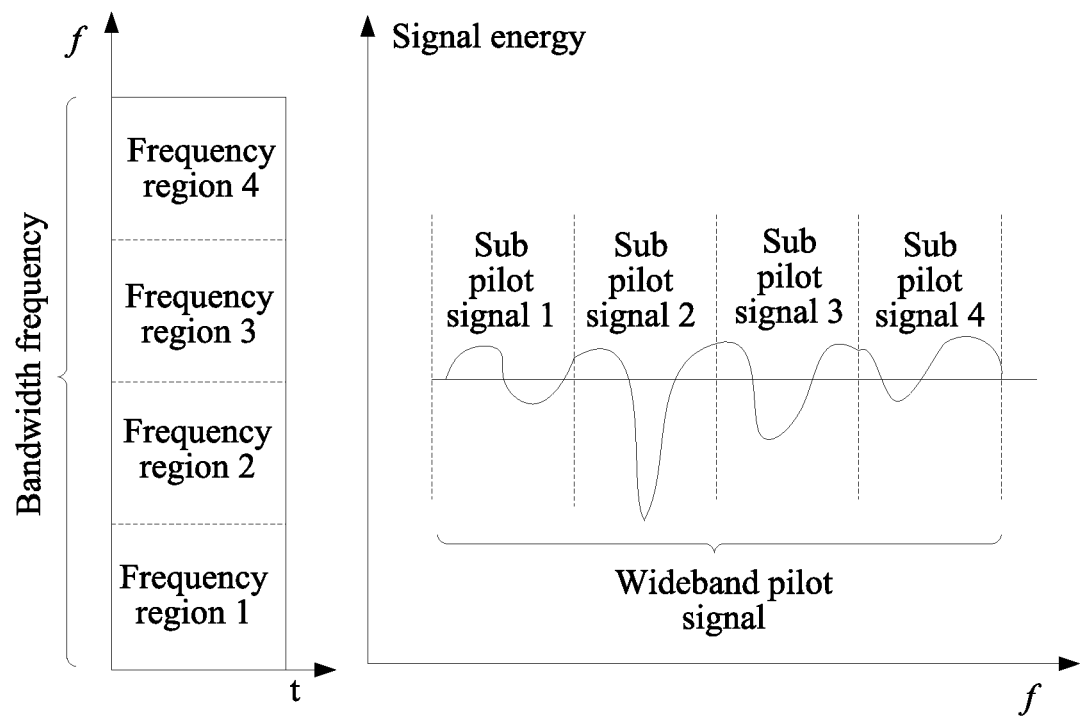
FIG. 6B is a schematic diagram of pilot signal division and corresponding frequency regions where an embodiment of the present invention is applied.

Referring to FIG. 6B, FIG. 6B is a schematic diagram of pilot signal division and corresponding frequency regions where this embodiment is applied.

In FIG. 6B, the left part is the whole bandwidth frequency on the transmitting apparatus side, and the right part is an energy curve on the frequency of the wideband pilot signal after being transmitted through a radio channel. After receiving the wideband pilot signal, the receiving apparatus may divide the wideband pilot signal in the frequency domain according to a frequency interval.

As shown in FIG. 6B, it is assumed that the received pilot signal is divided into four sub pilot signals in the frequency domain, which are a sub pilot signal 1, a sub pilot signal 2, a sub pilot signal 3, and a sub pilot signal 4, respectively. As can be seen from FIG. 6B, energy corresponding to each sub pilot signal in the frequency domain is different, where different energy corresponds to different fading features on the radio channel. The sub pilot signal 1 corresponds to the frequency region 1 on the bandwidth frequency in the frequency domain, the sub pilot signal 2 corresponds to the frequency region 2 on the bandwidth frequency in the frequency domain, the sub pilot signal 3 corresponds to the frequency region 3 on the bandwidth frequency in the frequency domain, and the sub pilot signal 4 corresponds to the frequency region 4 on the bandwidth frequency in the frequency domain.

Step 603. The receiving apparatus measures a CSI value of a sub pilot signal corresponding to each frequency region.

As can be seen with reference to FIG. 6B, in this embodiment, a CSI value of each sub pilot signal is measured, to obtain the CSI value of the sub pilot signal. For example, a CSI value of the sub pilot signal 1 may be called a first CSI value, a CSI value of the sub pilot signal 2 may be called a second CSI value, a CSI value of the sub pilot signal 3 may be called a third CSI value, and a CSI value of the sub pilot signal 4 may be called a fourth CSI value, respectively.

Step 604. The receiving apparatus acquires a threshold range, where a quantized value of each threshold range corresponds to a frequency region division manner.

By taking the frequency region 1 as an example, it is assumed that the frequency region 1 is preset with two threshold ranges, which are a first threshold range [0, 0.5] (including 0.5) and a second threshold range (0.5, 1] (not including 0.5), respectively. For convenience of feeding back to the transmitting apparatus a threshold range to which the measured CSI value belongs, the threshold ranges may be quantized, so that it is convenient to transmit information about the threshold range. For example, a quantized value of the first threshold range is set to 0, and a quantized value of the second threshold range is set to 1. It should be noted that, the setting of the threshold ranges is merely exemplary, and the preset threshold ranges of frequency regions other than the frequency region 1 may be the same as or different from that of the frequency region 1, which are not limited in the embodiment of the present invention.

In the two threshold ranges that are set above, it is assumed that the first threshold range correspondingly divides the frequency region 1 into one frequency domain resource, which is corresponding to one subcarrier; the second threshold range correspondingly divides the frequency region 1 into two frequency domain resources, which are corresponding to two subcarriers.

Step 605. The receiving apparatus determines a threshold range to which the CSI value of the sub pilot signal corresponding to the frequency region belongs, and feeds back a quantized value of the threshold range to the transmitting apparatus.

By still taking the frequency region 1 in FIG. 6B as an example, assuming that the first CSI value of the sub pilot signal 1 corresponding to the frequency region 1 is 0.8, the first CSI value belongs to the second threshold range, and in this case, the receiving apparatus feeds back the quantized value "1" of the second threshold range to the transmitting apparatus.

Step 606. The transmitting apparatus divides the frequency region in a frequency region division manner corresponding to the quantized value.

The transmitting apparatus can obtain the corresponding second threshold range according to the received quantized value "1", and therefore can divide the frequency region 1 into two frequency domain resources, and two data signals are subsequently carried by two subcarriers in frequency region 1 for transmission.

As can be seen from the foregoing embodiment, a receiving apparatus can feed back a CSI value of a sub pilot signal corresponding to each frequency region to a transmitting apparatus according to a received wideband pilot signal, so that the transmitting apparatus can divide the frequency region according to the CSI value; as division manners for frequency domain regions are different, the numbers of subcarriers in the frequency regions are correspondingly different, that is, frequency domain resources configured for the subcarriers on the whole bandwidth frequency are different, and adaptive adjustment can be performed on the frequency domain resources of the subcarriers according to CSI values, so that the frequency efficiency of the system can be improved, and the performance of the communications system can be ensured.

Corresponding to the embodiments of the adaptive frequency domain resource configuration method of the present invention, the present invention further provides embodiments of a transmitting apparatus, a receiving apparatus, and a communications system.

Figure 7:
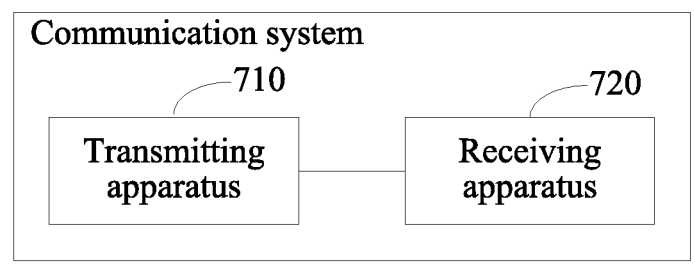
FIG. 7 is a block diagram of a communications system according to an embodiment of the present invention.

An embodiment of the present invention provides a communications system. Referring to FIG. 7, the communications system may include: a transmitting apparatus 710 and a receiving apparatus 720.

The transmitting apparatus 710 is configured to transmit a pilot signal to the receiving apparatus.

The receiving apparatus 720 is configured to feed back channel information of a channel for transmitting the pilot signal to the transmitting apparatus 710 by measuring the pilot signal.

The transmitting apparatus 710 is further configured to divide a bandwidth frequency of the transmitting apparatus according to the channel information.

In a specific embodiment:

The transmitting apparatus 710 is specifically configured to transmit a pilot signal to the receiving apparatus in each pre-divided frequency region, where all frequency regions form the bandwidth frequency of the transmitting apparatus.

The receiving apparatus 720 is specifically configured to measure CQI values corresponding to each frequency resource group of the transmitting apparatus in each frequency region, where frequency resource groups carry the pilot signal through subcarriers of different numbers, and feed back the CQI values corresponding to the frequency resource group to the transmitting apparatus, so that the transmitting apparatus acquires a maximum CQI value from the CQI values corresponding to the frequency resource group, and divides the frequency region according to the number of subcarriers corresponding to the maximum CQI value.

The transmitting apparatus 710 is specifically further configured to acquire the maximum CQI value from the CQI values corresponding to the frequency resource group, and divide the frequency region according to the number of the subcarriers corresponding to the maximum CQI value.

In another specific embodiment, the transmitting apparatus 710 is specifically configured to transmit a wideband pilot signal to the receiving apparatus on the bandwidth frequency.

The receiving apparatus 720 is specifically configured to divide the wideband pilot signal on the bandwidth frequency according to a frequency interval to obtain a group of sub pilot signals in a frequency domain, where each sub pilot signal corresponds to one frequency region on the bandwidth frequency; and compare the CSI value of the sub pilot signal corresponding to the frequency region with a threshold range, and feed back a comparison result to the transmitting apparatus.

The transmitting apparatus 710 is specifically further configured to divide each frequency region of the bandwidth frequency according to the comparison result fed back by the receiving apparatus.

The communications system shown in the foregoing embodiment may be a communications system that executes the foregoing method embodiments, and reference may be made to the description of the foregoing method embodiments for specific execution processes of the transmitting apparatus and the receiving apparatus in the communications system, which are not described herein again.

Figure 8:
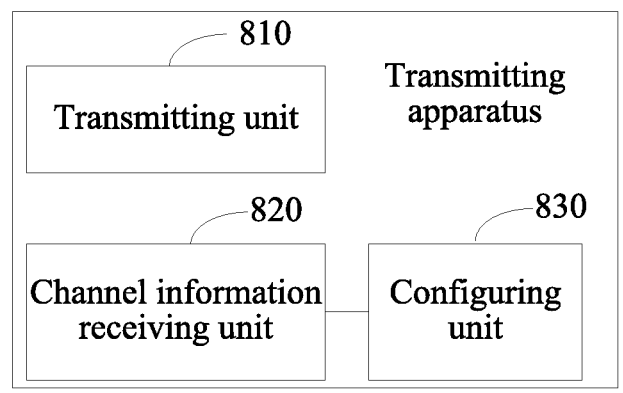
FIG. 8 is a block diagram of a transmitting apparatus according to an embodiment of the present invention.

An embodiment of the present invention provides a transmitting apparatus. Referring to FIG. 8, the transmitting apparatus may include: a transmitting unit 810, a channel information receiving unit 820, and a configuring unit 830.

The transmitting unit 810 is configured to transmit a pilot signal to a receiving apparatus.

The channel information receiving unit 820 is configured to receive channel information of a channel for transmitting the pilot signal, where the channel information is fed back by the receiving apparatus, and the channel information is information obtained by the receiving apparatus after measuring the pilot signal transmitted by the transmitting unit 810.

The configuring unit 830 is configured to divide a bandwidth frequency of the transmitting apparatus according to the channel information.

Figure 9:
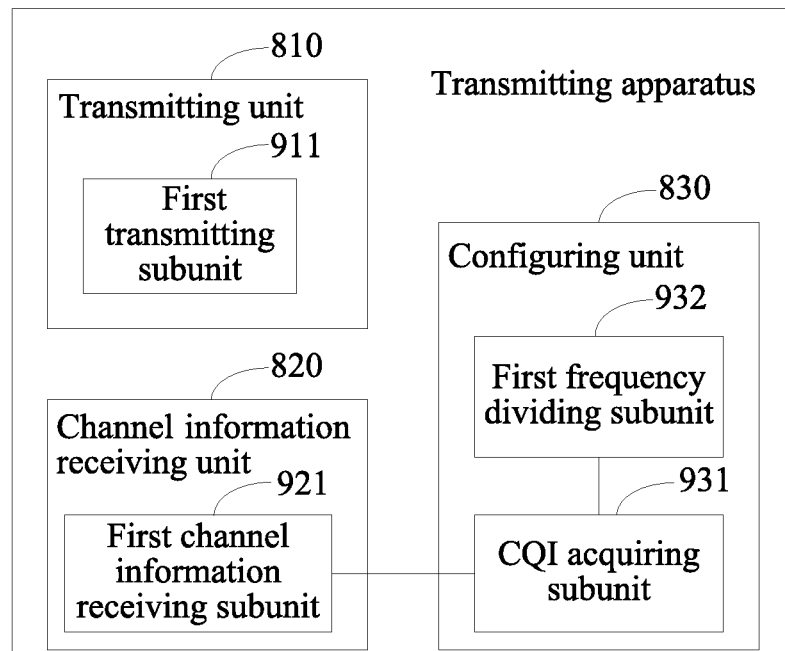
FIG. 9 is a block diagram of a transmitting apparatus according to another embodiment of the present invention.

An embodiment of the present invention provides another transmitting apparatus. Referring to FIG. 9, the transmitting apparatus may include: a transmitting unit 810, a channel information receiving unit 820, and a configuring unit 830.

The transmitting unit 810 includes a first transmitting subunit 911, configured to transmit a pilot signal to the receiving apparatus in each pre-divided frequency region, where all frequency regions form the bandwidth frequency of the transmitting apparatus.

The channel information receiving unit 820 includes a first channel information receiving subunit 921, configured to receive a group of CQI values of each frequency region, which is fed back by the receiving apparatus, where the group of the CQI values of the frequency region are CQI values measured by the receiving apparatus and corresponding to each frequency resource group of the first transmitting unit in the frequency region, and frequency resource groups carry the pilot signal through subcarriers of different numbers.

The configuring unit 830 includes a CQI acquiring subunit 931, configured to acquire a maximum CQI value from the CQI values corresponding to the frequency resource group; and a first frequency dividing subunit 932, configured to divide the frequency region according to the number of subcarriers corresponding to the maximum CQI value acquired by the CQI acquiring subunit.

The first transmitting subunit 911 may be specifically configured to correspondingly transmit N groups of pilot signals in each frequency region according to N frequency resource groups, where the N frequency resource groups are groups obtained by the transmitting apparatus by dividing the frequency region according to different numbers of subcarriers, N is a natural number, and a subcarrier in each frequency resource group carries a corresponding group of pilot signals; or transmit one group of pilot signals in each frequency region through a subcarrier included in a first frequency resource group, where the first frequency resource group is a frequency resource group with a maximum number of carriers in N frequency resource groups obtained by the transmitting apparatus by dividing the frequency region according to different numbers of subcarriers.

Figure 10:
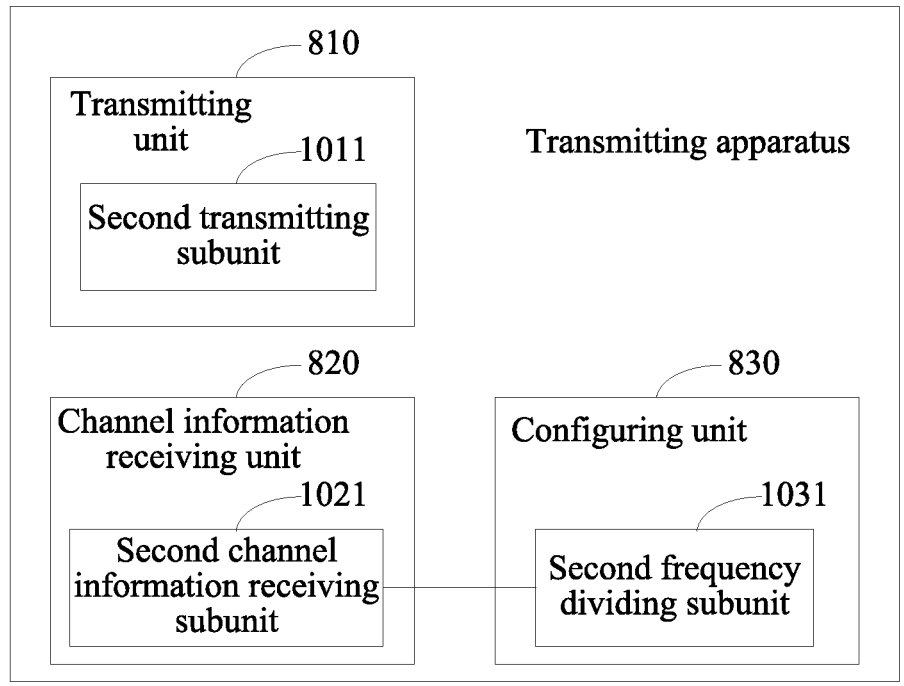
FIG. 10 is a block diagram of a transmitting apparatus according to another embodiment of the present invention.

An embodiment of the present invention provides still another transmitting apparatus. Referring to FIG. 10, the transmitting apparatus may include: a transmitting unit 810, a channel information receiving unit 820, and a configuring unit 830.

The transmitting unit 810 includes a second transmitting subunit 1011, configured to transmit a wideband pilot signal to the receiving apparatus on a bandwidth frequency of the transmitting apparatus.

The channel information receiving unit 820 includes a second channel information receiving subunit 1021, configured to receive a comparison result fed back by the receiving apparatus to the transmitting apparatus after the receiving apparatus measures a CSI value of a sub pilot signal corresponding to each frequency region and compares the CSI value of the sub pilot signal corresponding to the frequency region with a threshold range, where the sub pilot signal corresponding to the frequency region is a sub pilot signal corresponding to each divided frequency region obtained after the receiving apparatus divides the wideband pilot signal on the bandwidth frequency according to a frequency interval, the wideband pilot signal is transmitted by the second transmitting subunit, and each sub pilot signal corresponds to one frequency region on the bandwidth frequency.

The configuring unit 830 includes a second frequency dividing subunit 1031, configured to divide each frequency region of the bandwidth frequency according to the comparison result fed back by the receiving apparatus and received by the second channel information receiving subunit.

In a specific embodiment, the comparison result fed back by the receiving apparatus and received by the second channel information receiving subunit 1021 is specifically a quantized value of a threshold range, and the quantized value of the threshold range is a quantized value fed back to the transmitting apparatus after the receiving apparatus determines a threshold range to which the CSI value of the sub pilot signal corresponding to the frequency region belongs.

The second frequency dividing subunit 1031 is specifically configured to divide the frequency region in a frequency region division manner corresponding to the received quantized value of the threshold range.

Figure 11:
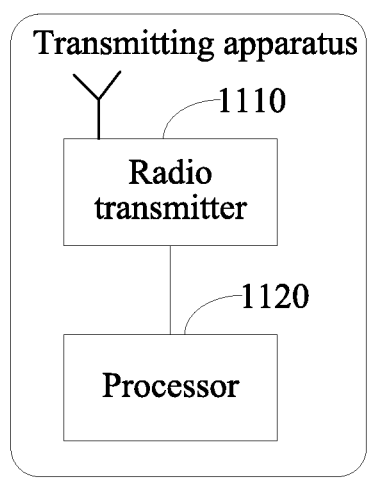
FIG. 11 is a block diagram of a transmitting apparatus according to another embodiment of the present invention.

An embodiment of the present invention provides yet another transmitting apparatus. Referring to FIG. 11, the transmitting apparatus may include: a radio transmitter 1110 and a processor 1120.

The radio transmitter 1110 is configured to transmit a pilot signal to a receiving apparatus.

The processor 1120 is configured to: after receiving channel information of a channel for transmitting the pilot signal, where the channel information is fed back by the receiving apparatus, divide a bandwidth frequency of the transmitting apparatus according to the channel information, where the channel information is information obtained by the receiving apparatus after measuring the pilot signal.

In a specific embodiment, the radio transmitter 1110 is specifically configured to transmit a pilot signal to the receiving apparatus in each pre-divided frequency region, where all frequency regions form the bandwidth frequency of the transmitting apparatus.

The processor 1120 is specifically configured to receive a group of CQI values of each frequency region, CQI values corresponding to each frequency resource group in the frequency region, and the frequency resource group, which are fed back by the receiving apparatus, acquire a maximum CQI value from the group of the CQI values corresponding to the frequency resource group, and divide the frequency region according to the number of subcarriers corresponding to the maximum CQI value.

In another specific embodiment, the radio transmitter 1110 is specifically configured to transmit a wideband pilot signal to the receiving apparatus on the bandwidth frequency.

The processor 1120 is specifically configured to receive a comparison result fed back by the receiving apparatus to the transmitting apparatus after the receiving apparatus measures a CSI value of a sub pilot signal corresponding to each frequency region and compares the CSI value of the sub pilot signal corresponding to the frequency region with a threshold range, where the sub pilot signal corresponding to the frequency region is a sub pilot signal corresponding to each divided frequency region obtained after the receiving apparatus divides the wideband pilot signal on the bandwidth frequency according to a frequency interval, and each sub pilot signal corresponds to one frequency region on the bandwidth frequency; and divide each frequency region of the bandwidth frequency according to the comparison result fed back by the receiving apparatus.

The transmitting apparatuses shown in the embodiments in FIG. 8 to FIG. 11 may be transmitting apparatuses that execute the foregoing method embodiments, and may also be the transmitting apparatuses shown in the foregoing embodiments of the communications system, and reference may be made to the foregoing method embodiments and system embodiment for specific description, which is not described herein again.

Figure 12:
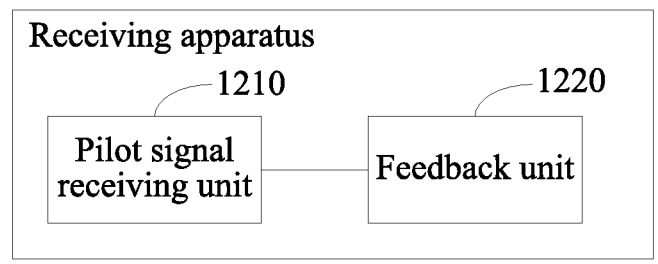
FIG. 12 is a block diagram of a receiving apparatus according to an embodiment of the present invention.

An embodiment of the present invention provides a receiving apparatus. Referring to FIG. 12, the receiving apparatus may include: a pilot signal receiving unit 1210 and a feedback unit 1220.

The pilot signal receiving unit 1210 is configured to receive a pilot signal transmitted by a transmitting apparatus.

The feedback unit 1220 is configured to feed back channel information of a channel for transmitting the pilot signal to the transmitting apparatus by measuring the pilot signal received by the pilot signal receiving unit 1210, so that the transmitting apparatus divides a bandwidth frequency of the transmitting apparatus according to the channel information.

Figure 13:
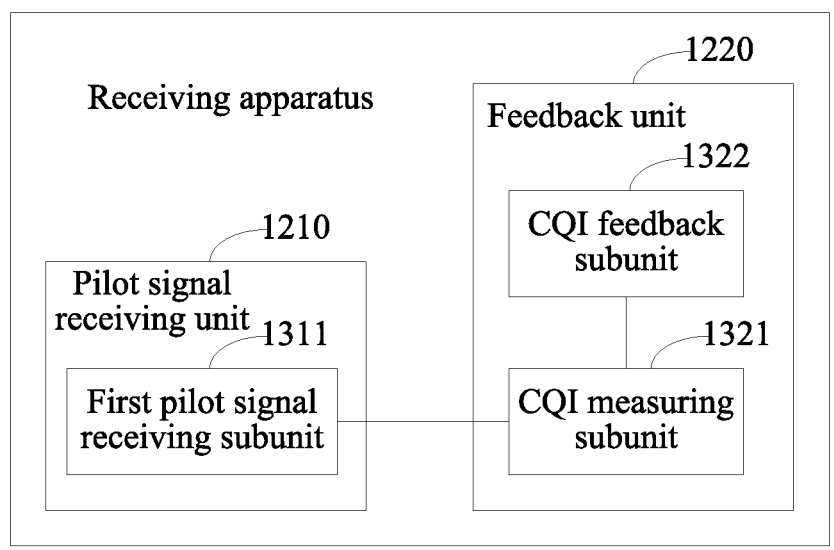
FIG. 13 is a block diagram of a receiving apparatus according to another embodiment of the present invention.

An embodiment of the present invention provides another receiving apparatus. Referring to FIG. 13, the receiving apparatus may include: a pilot signal receiving unit 1210 and a feedback unit 1220.

The pilot signal receiving unit 1210 includes a first pilot signal receiving subunit 1311, configured to receive a pilot signal, where the pilot signal is transmitted by the transmitting apparatus in each pre-divided frequency region, and all frequency regions form the bandwidth frequency of the transmitting apparatus.

The feedback unit 1220 includes a CQI measuring subunit 1321, configured to measure CQI values corresponding to each frequency resource group of the transmitting apparatus in each frequency region, where frequency resource groups carry the pilot signal through subcarriers of different numbers; and a CQI feedback subunit 1322, configured to feed back the CQI value measured by the CQI measuring subunit and corresponding to the frequency resource group to the transmitting apparatus, so that the transmitting apparatus acquires a maximum CQI value from the CQI values corresponding to the frequency resource group and divides the frequency region according to the number of subcarriers corresponding to the maximum CQI value.

In a specific embodiment, the first pilot signal receiving subunit 1311 is specifically configured to receive N groups of pilot signals, where the N groups of the pilot signals are correspondingly transmitted by the transmitting apparatus in each frequency region according to N frequency resource groups, the N frequency resource groups are groups obtained by the transmitting apparatus by dividing the frequency region according to different numbers of subcarriers, N is a natural number, and a subcarrier in each frequency resource group carries a corresponding group of pilot signals.

The CQI measuring subunit 1321 is specifically configured to measure the N groups of the pilot signals in the frequency region received by the first pilot signal receiving subunit 1311, to obtain N CQI values of each frequency region.

The CQI feedback subunit 1322 is specifically configured to sort CQI values in a group of CQI values in a descending order, where the group of the CQI values is measured by the CQI measuring subunit, and then feed back the group of the CQI values sorted in a descending order to the transmitting apparatus.

In another specific embodiment, the first pilot signal receiving subunit 1311 is specifically configured to receive a group of pilot signals, where the group of the pilot signals is transmitted by the transmitting apparatus in each frequency region through a subcarrier included in a first frequency resource group, and the first frequency resource group is a frequency resource group with a maximum number of carriers in N frequency resource groups obtained by the transmitting apparatus by dividing the frequency region according to different numbers of subcarriers.

The CQI measuring subunit 1321 is specifically configured to measure CQI values of all pilot signals in the group of the pilot signals corresponding to the first frequency resource group, use a sum of the CQI values of all the pilot signals as a CQI value of the group of the pilot signals, obtain a pilot signal in each of frequency resource groups other than the first frequency resource group in the N frequency resource groups by combining in a frequency domain the pilot signals in the group of the pilot signals, measure a CQI value of a group of pilot signals corresponding to each of the other frequency resource groups, and use the CQI value of the group of the pilot signals corresponding to the first frequency resource group and the CQI value of the group of the pilot signals corresponding to each of the other frequency resource groups as a group of CQI values of each frequency region.

The CQI feedback subunit 1322 is specifically configured to sort CQI values in a group of CQI values in a descending order, where the group of the CQI values is measured by the CQI measuring subunit 1321, and then feed back the group of the CQI values sorted in a descending order to the transmitting apparatus.

Figure 14:
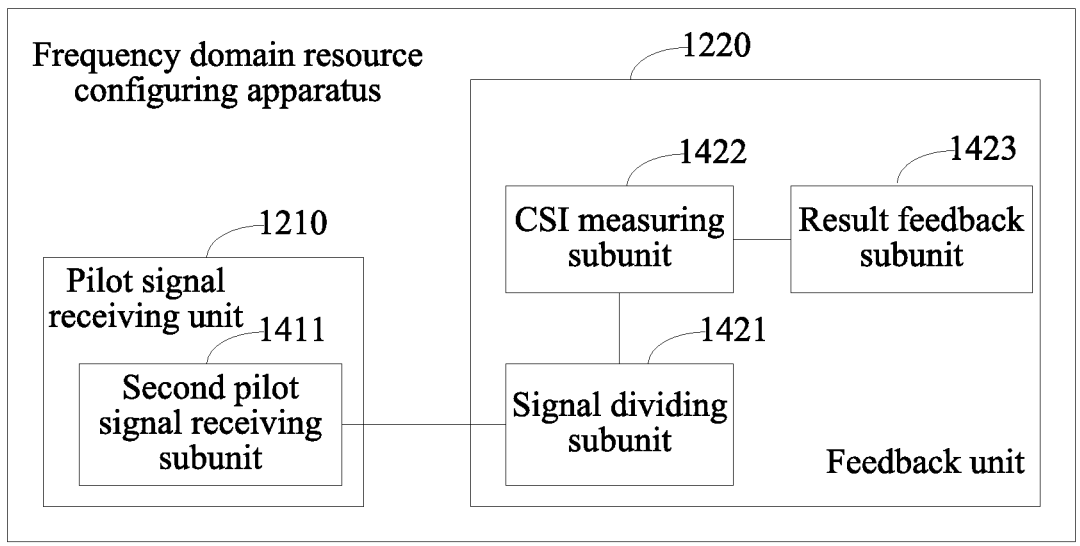
FIG. 14 is a block diagram of a receiving apparatus according to another embodiment of the present invention.

An embodiment of the present invention provides still another receiving apparatus. Referring to FIG. 14, the receiving apparatus may include: a pilot signal receiving unit 1210 and a feedback unit 1220.

The pilot signal receiving unit 1210 includes a second pilot signal receiving subunit 1411, configured to receive a wideband pilot signal, where the wideband pilot signal is transmitted by the transmitting apparatus on the bandwidth frequency.

The feedback unit 1220 includes: a signal dividing subunit 1421, configured to divide the wideband pilot signal on the bandwidth frequency according to a frequency interval, where the wideband pilot signal is received by the second pilot signal receiving subunit 1411, to obtain a group of sub pilot signals in a frequency domain, and each sub pilot signal corresponds to one frequency region on the bandwidth frequency; a CSI measuring subunit 1422, configured to measure a CSI value of a sub pilot signal corresponding to each frequency region divided by the signal dividing subunit; and a result feedback subunit 1423, configured to compare the CSI value of the sub pilot signal corresponding to the frequency region with a threshold range, where the CSI value is measured by the CSI measuring subunit, and feed back a comparison result to the transmitting apparatus, so that the transmitting apparatus divides the frequency region according to the comparison result.

In a specific embodiment, the result feedback subunit 1423 is specifically configured to acquire a preset threshold range, where a quantized value of each threshold range corresponds to one frequency region division manner, determine a threshold range to which the CSI value of the sub pilot signal corresponding to the frequency region belongs, and feed back a quantized value of the threshold range to the transmitting apparatus, so that the transmitting apparatus divides the frequency region in a frequency region division manner corresponding to the quantized value.

Figure 15:
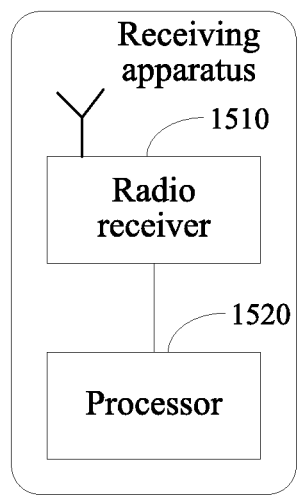
FIG. 15 is a block diagram of a receiving apparatus according to another embodiment of the present invention.

An embodiment of the present invention provides yet another receiving apparatus. Referring to FIG. 15, the receiving apparatus may include: a radio receiver 1510 and a processor 1520.

The radio receiver 1510 is configured to receive a pilot signal transmitted by a transmitting apparatus.

The processor 1520 is configured to feed back channel information of a channel for transmitting the pilot signal to the transmitting apparatus by measuring the pilot signal, so that the transmitting apparatus divides a bandwidth frequency of the transmitting apparatus according to the channel information.

In a specific embodiment, the radio transmitter 1510 is specifically configured to transmit a pilot signal to the receiving apparatus in each pre-divided frequency region, where all frequency regions form the bandwidth frequency of the transmitting apparatus.

The processor 1520 is specifically configured to measure CQI values corresponding to each frequency resource group of the transmitting apparatus in each frequency region, where frequency resource groups carry the pilot signal through subcarriers of different numbers, and feed back the CQI values corresponding to the frequency resource group to the transmitting apparatus, so that the transmitting apparatus acquires a maximum CQI value from the CQI values corresponding to the frequency resource group and divides the frequency region according to the number of subcarriers corresponding to the maximum CQI value.

In another specific embodiment, the radio receiver 1510 is specifically configured to receive a wideband pilot signal, where the wideband pilot signal is transmitted by the transmitting apparatus on the bandwidth frequency.

The processor 1520 is specifically configured to divide the wideband pilot signal on the bandwidth frequency according to a frequency interval to obtain a group of sub pilot signals in a frequency domain, where each sub pilot signal corresponds to one frequency region on the bandwidth frequency, measure a channel state information CSI value of a sub pilot signal corresponding to each frequency region, compare the CSI value of the sub pilot signal corresponding to the frequency region with a threshold range, and feed back a comparison result to the transmitting apparatus, so that the transmitting apparatus divides the frequency region according to the comparison result.

The receiving apparatuses shown in the embodiments in FIG. 12 to FIG. 15 may be receiving apparatuses that execute the foregoing method embodiments, and may also be the receiving apparatuses shown in the foregoing embodiments of the communications system, and reference may be made to the foregoing method embodiments and system embodiment for specific description, which is not described herein again.

Figure 16A:
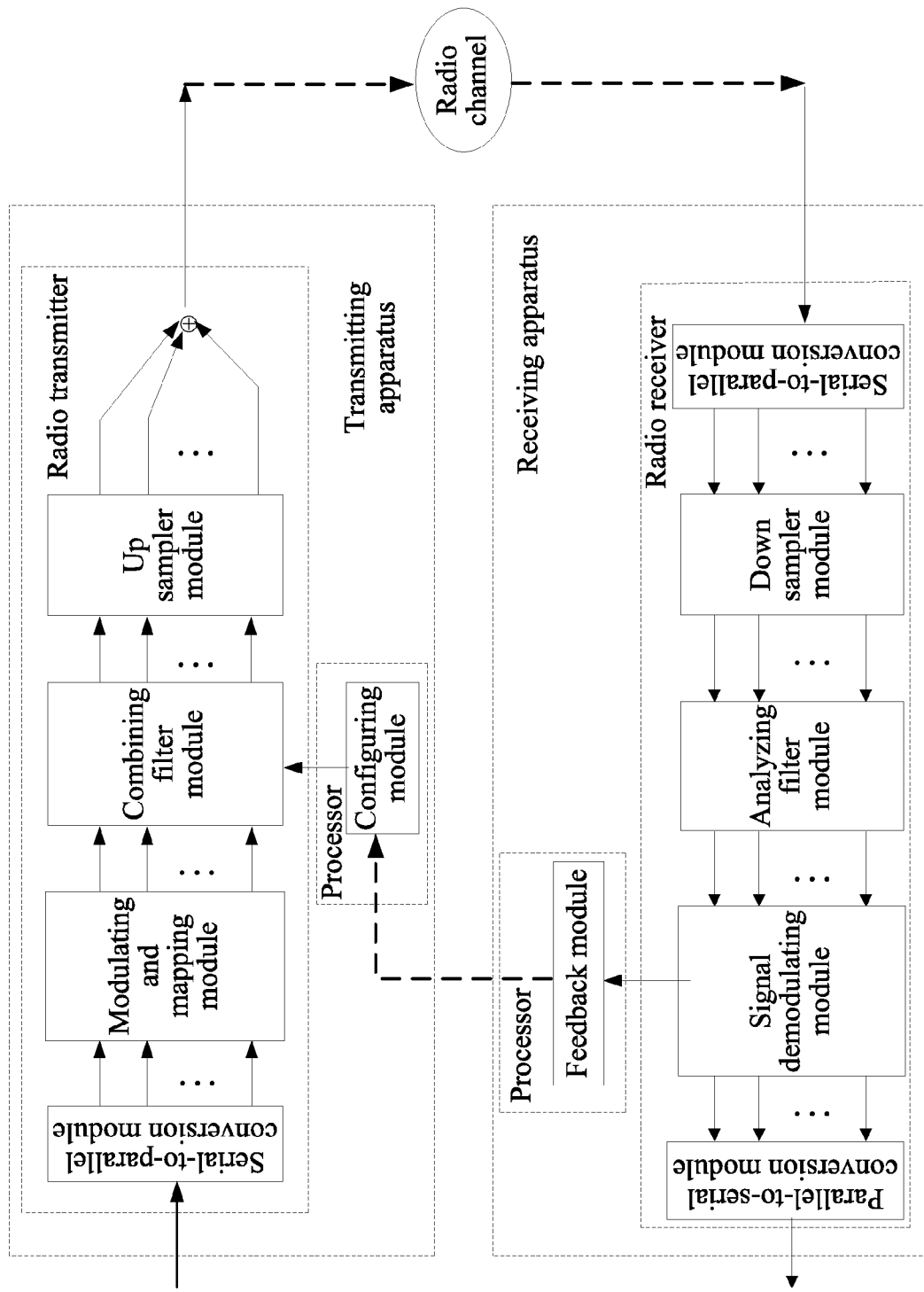
FIG. 16A is a schematic diagram of an architecture of a communications system that applies an adaptive frequency domain resource configuration method in an embodiment of the present invention.
Figure 16B:
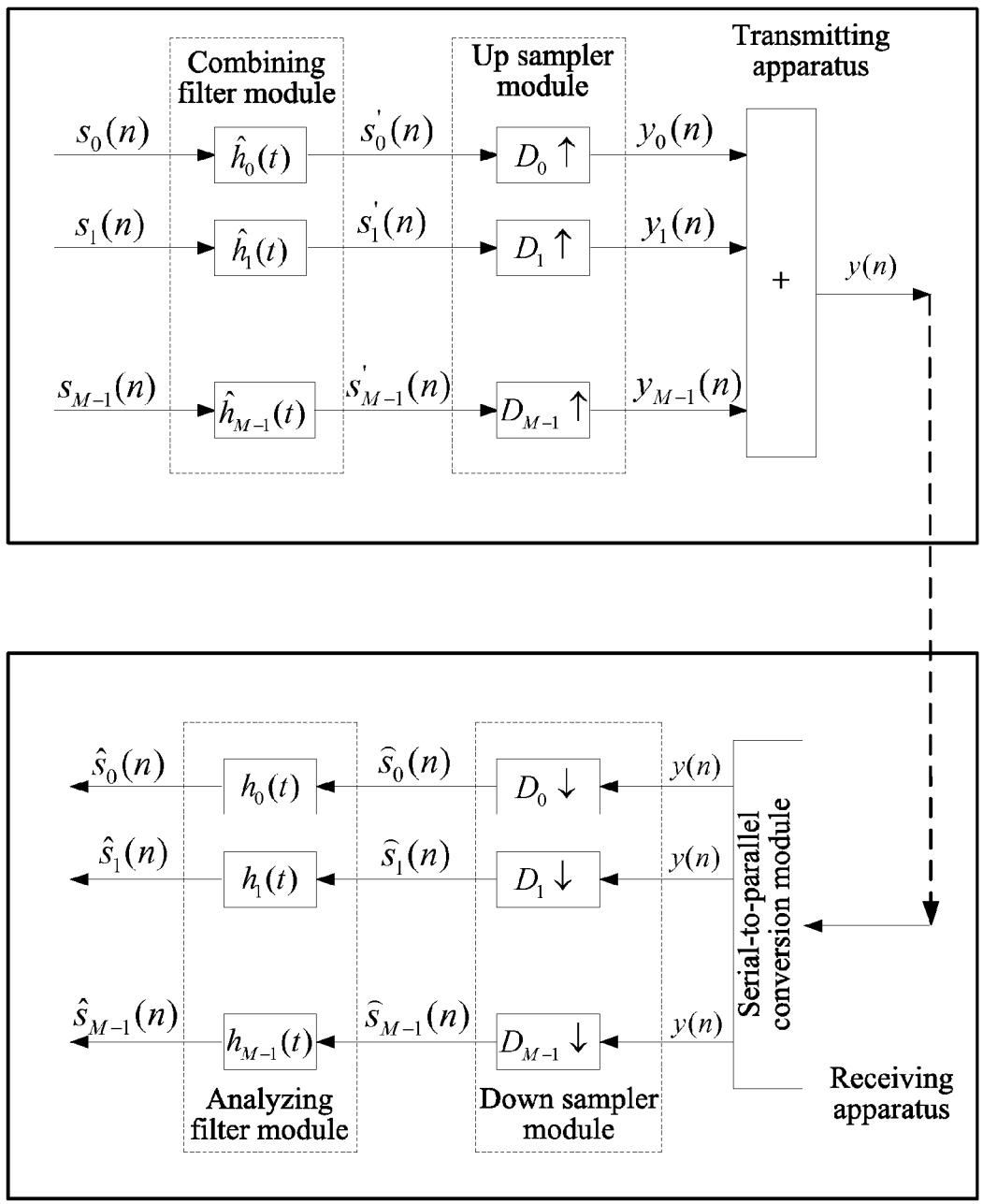
FIG. 16B is a schematic diagram of a signal flow in the communications system in FIG. 16A.

FIG. 16A is a schematic diagram of an architecture of a communications system that applies an adaptive frequency domain resource configuration method according to an embodiment of the present invention, and FIG. 16B is a schematic diagram of a signal flow in the communications system shown in FIG. 16A.

As can be seen from FIG. 16A, the communications system includes: a transmitting apparatus and a receiving apparatus, where the transmitting apparatus is connected to the receiving apparatus through a radio channel. The transmitting apparatus in FIG. 16A may be a transmitting apparatus described in the foregoing method embodiments and the transmitting apparatus embodiments, and the receiving apparatus in FIG. 16A may be a receiving apparatus described in the foregoing method embodiments and the receiving apparatus embodiments.

When the transmitting apparatus is the transmitting apparatus described with reference to FIG. 11, and the receiving apparatus is the receiving apparatus described with reference to FIG. 15, the radio transmitter in the transmitting apparatus may include a serial-to-parallel conversion module, a modulating and mapping module, a combining filter module, and an up sampler module, and the processor in the transmitting apparatus may include a configuring module; the radio receiver in the receiving apparatus may include: a serial-to-parallel conversion module, a down sampler module, an analyzing filter module, a signal demodulating module, and a parallel-to-serial conversion module, and the processor in the receiving apparatus may include a feedback module. In the embodiment of the present invention, to implement configuration of a variable frequency domain resource, through a connection between the feedback module in the receiving apparatus and the configuring module in the transmitting apparatus, the configuring module is connected to the combining filter module, where the feedback module communicates with the configuring module through an air interface, as shown by the dotted arrow between the feedback module and the configuring module in FIG. 16A.

With reference to FIG. 16A and FIG. 16B, signal processing processes of the transmitting apparatus and the receiving apparatus and a process where the receiving apparatus feeds back measured channel information to the configuring module of the transmitting apparatus through the feedback module, so that the transmitting apparatus performs adaptive configuration on a frequency domain resource are described in the following.

On the transmitting apparatus side, a group of M serial signals $s_i(n)$ (where i=0 to M−1, and M is a natural number) is provided, where n indicates a variable of a group of discrete signals, a value of n is a positive integer, and the group of serial signals may also be represented by $s_0(n), \ldots, s_{M-1}(n)$. After the group of serial signals is input to the serial-to-parallel conversion module, a group of parallel signals $$\begin{pmatrix} s_0(n) \\ s_1(n) \\ \ldots \\ s_{M-1}(n) \end{pmatrix}$$

is output. After being modulated by the modulating and mapping module, the parallel signals are output to the combining filter module, where the combining filter module includes a group of filters, where the number of the filters is same as that of the signals. As shown in FIG. 16B, after the group of parallel signals $$\begin{pmatrix} s_0(n) \\ s_1(n) \\ \ldots \\ s_{M-1}(n) \end{pmatrix}$$

is filtered by a group of filters $$\begin{pmatrix} \hat{h}_0(n) \\ \hat{h}_1(n) \\ \ldots \\ \hat{h}_{M-1}(n) \end{pmatrix},$$

parallel signals $$\begin{pmatrix} s'_0(n) \\ s'_1(n) \\ \ldots \\ s'_{M-1}(n) \end{pmatrix}$$

are output, where the parallel signals $$\begin{pmatrix} s'_0(n) \\ s'_1(n) \\ \ldots \\ s'_{M-1}(n) \end{pmatrix}$$

may be represented by $$s'_m(n) = \sum_k s_m(k)\hat{h}_m(n-k),$$

where the value of m ranges from 0 to M−1, k indicates a variable of a group of discrete signals, a value of k is a positive integer, and the foregoing equation $$s'_m(n) = \sum_k s_m(k)\hat{h}_m(n-k)$$

indicates that $s'_m(n)$ is obtained by performing a convolution operation on the signal $s_m(n)$ through $\hat{h}_m(n)$. The signals $$\begin{pmatrix} s'_0(n) \\ s'_1(n) \\ \ldots \\ s'_{M-1}(n) \end{pmatrix}$$

filtered by the combining filter are input to the up sampler module, and sampled parallel signals $$\begin{pmatrix} y_0(n) \\ y_1(n) \\ \ldots \\ y_{M-1}(n) \end{pmatrix}$$

are output after sampling processing by a group of up samplers $$\begin{pmatrix} D_0 \uparrow \\ D_1 \uparrow \\ \ldots \\ D_{M-1} \uparrow \end{pmatrix},$$

and the parallel signals after being combined are represented by:

$$y(n) = \sum_{m=0}^{M-1} y_m(n) = \sum_{m=0}^{M-1} \sum_k s_m(k)\hat{h}_m(n - D_m k).$$

The transmitting apparatus transmits the signals y(n), and the signals y(n) are transmitted to the receiving apparatus through the radio channel.

On the receiving apparatus side, assuming that the signals y(n) are transmitted through an ideal radio channel, signals received by the receiving apparatus are the signals y(n) transmitted by the transmitting apparatus. the receiving apparatus side, the received signals y(n) are first input to the serial-to-parallel conversion module for serial-to-parallel processing, to obtain a group of parallel signals $$\begin{pmatrix} y(n) \\ y(n) \\ \ldots \\ y(n) \end{pmatrix}.$$

After the parallel signals are input to the down sampler module, and undergo sampling processing by a group of down samplers $$\begin{pmatrix} D_0 \downarrow \\ D_1 \downarrow \\ \ldots \\ D_{M-1} \downarrow \end{pmatrix},$$

the sampled parallel signals $$\begin{pmatrix} \hat{s}_0(n) \\ \hat{s}_1(n) \\ \ldots \\ \hat{s}_{M-1}(n) \end{pmatrix}$$

are output. The signals $\hat{s}_i(n)$ after the down sampling processing may be represented by: $\hat{s}_i(n) = y(D_i n)$, where a value of i ranges from 0 to M−1. After being processed by the down sampler module, the signals $\hat{s}_i(n)$ are input to the analyzing filter module, and after being filtered by a group of analyzing filters $$\begin{pmatrix} h_0(n) \\ h_1(n) \\ \ldots \\ h_{M-1}(n) \end{pmatrix},$$

a group of parallel signals $$\begin{pmatrix} \hat{s}_0(n) \\ \hat{s}_1(n) \\ \ldots \\ \hat{s}_{M-1}(n) \end{pmatrix}$$

is re-established, where the parallel signals may be represented by:

$$\hat{s}_i(n) = \sum_l \hat{s}_i(l) h_i(D_i n - l) = \sum_{m=0}^{M-1} \sum_l \sum_k s_m(k) \hat{h}_m(l - D_m k) h_i(D_i n - l) \; i = 0, 1, \ldots, M-1.$$

After the parallel signals $\hat{s}_i(n)$ are input to the signal demodulating module for demodulation and then processed by the parallel-to-serial conversion module, serial signals are output.

Figure 16C:
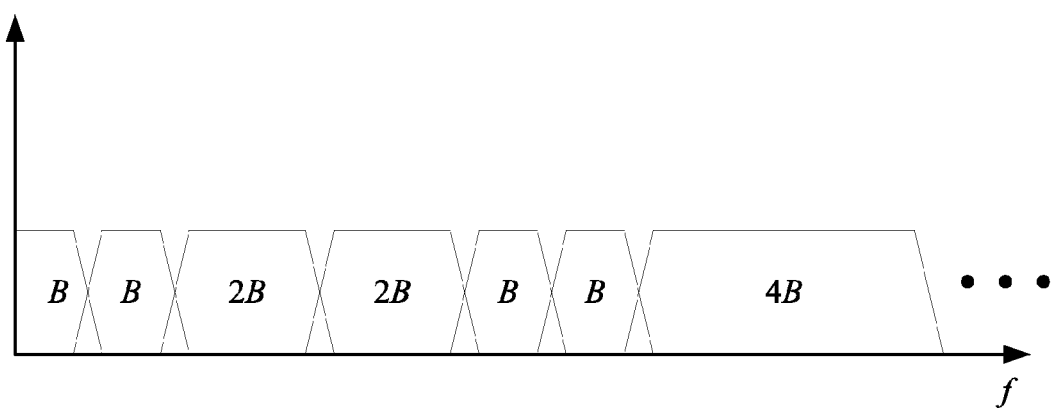
FIG. 16C is a schematic diagram of subcarriers configured with different frequency domain resources in an embodiment of the present invention.

When the embodiment of the present invention is applied, the transmitting apparatus inputs a group of pilot signals to the serial-to-parallel conversion module, after being processed by the modules in the transmitting apparatus, the pilot signals are transmitted to the receiving apparatus through a radio channel; and the receiving apparatus processes the pilot signals through the modules, where the feedback module acquires pilot signals after being demodulated by the signal demodulating module, measures the pilot signals according to the description in the foregoing embodiments of the present invention, and transmits measured channel information to the configuring module of the transmitting apparatus through an air interface, the configuring module divides a bandwidth frequency according to the channel information fed back by the feedback module, and inputs a division result to the combining filter module; subsequently, when the transmitting module transmits a regular data signal, the combining filter module may select a group of filters corresponding to different frequency resources according to the division result, where each filter corresponds to one subcarrier. In this way, the data signal after being filtered by the combining filter module is modulated to different subcarriers, where data signals carried by different subcarriers have different frequency bandwidths. FIG. 16C is a schematic diagram of subcarriers configured with different frequency domain resources in an embodiment of the present invention, where B indicates a base unit of frequency bandwidth.

As can be seen from the foregoing embodiment, a transmitting apparatus transmits a pilot signal to a receiving apparatus, the receiving apparatus feeds back channel information of a channel for transmitting the pilot signal to the transmitting apparatus by measuring the pilot signal, and the transmitting apparatus divides a bandwidth frequency according to the channel information. In the embodiment of the present invention, the receiving apparatus can feed back the channel information to the transmitting apparatus according to the received pilot signal, so that the transmitting apparatus can divide the bandwidth frequency according to channel quality; as sizes of divided frequency domain resources may be different, and each frequency domain resource corresponds to one subcarrier, that is, different frequency domain resources are configured for subcarriers, adaptive adjustment can be performed on the frequency domain resources of the subcarriers according to the channel information fed back by the receiving apparatus, so that the frequency efficiency of the system can be improved, and the performance of the communications system can be ensured.

It is clear to a person skilled in the art that the technologies in the embodiments of the present invention may be accomplished through software plus a necessary universal hardware platform. Based on this, the above technical solutions in the embodiments of the present invention or the part that makes contributions to the prior art can be substantially embodied in the form of a software product. The computer software product may be stored in a computer readable storage medium such as a ROM/RAM, a magnetic disk, or an optical disc, and contain several instructions to instruct computer equipment (for example, a personal computer, a server, or network equipment) to perform the method described in the embodiments of the present invention or in some parts of the embodiments.

The embodiments in this specification are all described in a progressive manner, mutual reference may be made to the same or similar part of the embodiments, and each embodiment focuses on illustrate difference from other embodiments. In particular, for the system embodiment, since it is basically similar to the method embodiment, the apparatus embodiment is described simply, and the relevant part may be obtained with reference to the part of the description of the method embodiment.

The foregoing embodiments of the present invention are not intended to limit the protection scope of the present inventions, equivalent replacements and improvements made within the spirit and principle of the present invention shall fall within the protection scope of the present invention.

What is claimed is:

1. An adaptive frequency domain resource configuration method, comprising:

receiving, by a receiving apparatus, a group of pilot signals transmitted by a transmitting apparatus, wherein the group of pilot signals is transmitted by the transmitting apparatus in each of a plurality of frequency regions, wherein all frequency regions form a bandwidth frequency of the transmitting apparatus, wherein the group of pilot signals is transmitted through a subcarrier comprised in a first frequency resource group, and the first frequency resource group is a frequency resource group with a maximum number of carriers in N frequency resource groups obtained by the transmitting apparatus by dividing the frequency regions according to different numbers of subcarriers;

measuring, by the receiving apparatus, Channel Quality Indicator (CQI) values of all pilot signals in the group of the pilot signals corresponding to the first frequency resource group, and using a sum of the CQI values of all the pilot signals in the group of pilot signals as a CQI value of the group of the pilot signals;

obtaining, by the receiving apparatus, a pilot signal in each frequency resource group other than the first frequency resource group in the N frequency resource groups by combining in a frequency domain the pilot signals in the group of the pilot signals corresponding to the first frequency resource group, wherein N is a natural number;

measuring, by the receiving apparatus, a CQI value of a group of pilot signals corresponding to each of the other frequency resource groups in the N frequency resource groups; and using the CQI value of the group of the pilot signals corresponding to the first frequency resource group and the CQI values of the groups of the pilot signals corresponding to each of the other frequency resource groups in the N frequency resource groups as a group of CQI values of each frequency region; and feeding back, by the receiving apparatus, the CQI values corresponding to the first frequency resource group to the transmitting apparatus, so that the transmitting apparatus acquires a maximum CQI value from the CQI values corresponding to the first frequency resource group and configures frequency domain resources for a plurality of subcarriers by dividing the frequency regions according to a number of subcarriers corresponding to the maximum CQI value.

2. A communications system, comprising:

a transmitter; and a receiver;

receiving, by the receiver, a group of pilot signals transmitted by the transmitter, wherein the group of pilot signals is transmitted by the transmitter in each of a plurality of frequency regions, wherein all frequency regions form a bandwidth frequency of the transmitter, wherein the group of pilot signals is transmitted through a subcarrier comprised in a first frequency resource group, and the first frequency resource group is a frequency resource group with a maximum number of carriers in N frequency resource groups obtained by the transmitter by dividing the frequency regions according to different numbers of subcarriers, and N is a natural number;

measuring, by the receiver, Channel Quality Indicator (CQI) values of all pilot signals in the group of the pilot signals corresponding to the first frequency resource group, and using a sum of the CQI values of all the pilot signals in the group of pilot signals as a CQI value of the group of the pilot signals;

obtaining, by the receiver, a pilot signal in each frequency resource group other than the first frequency resource group in the N frequency resource groups by combining in a frequency domain the pilot signals in the group of the pilot signals corresponding to the first frequency resource group;

measuring, by the receiver, a CQI value of a group of pilot signals corresponding to each of the other frequency resource groups in the N frequency resource groups; and using the CQI value of the group of the pilot signals corresponding to the first frequency resource group and the CQI values of the groups of the pilot signals corresponding to each of the other frequency resource groups in the N frequency resource groups as a group of CQI values of each frequency region; and feeding back, by the receiver, the CQI values corresponding to the first frequency resource group to the transmitter, so that the transmitter acquires a maximum CQI value from the CQI values corresponding to the first frequency resource group and configures frequency domain resources for a plurality of subcarriers by dividing the frequency regions according to a number of subcarriers corresponding to the maximum CQI value.

3. A receiving apparatus, comprising:

a radio receiver, configured to receive a group of pilot signals transmitted by a transmitting apparatus, wherein the group of pilot signals is transmitted by the transmitting apparatus in each of a plurality of frequency regions, wherein all frequency regions form a bandwidth frequency of the transmitting apparatus, wherein the group of pilot signals is transmitted through a subcarrier comprised in a first frequency resource group, and the first frequency resource group is a frequency resource group with a maximum number of carriers in N frequency resource groups obtained by the transmitting apparatus by dividing the frequency regions according to different numbers of subcarriers, and N is a natural number; and a processor, configured to:

measure Channel Quality Indicator (CQI) values of all pilot signals in the group of the pilot signals corresponding to the first frequency resource group, and use a sum of the CQI values of all the pilot signals in the group of pilot signals as a CQI value of the group of the pilot signals;

obtain a pilot signal in each frequency resource group other than the first frequency resource group in the N frequency resource groups by combining in a frequency domain the pilot signals in the group of the pilot signals corresponding to the first frequency resource grow;

measure a CQI value of a group of pilot signals corresponding to each of the other frequency resource groups in the N frequency resource groups; and use the CQI value of the group of the pilot signals corresponding to the first frequency resource group and the CQI values of the groups of the pilot signals corresponding to each of the other frequency resource groups in the N frequency resource groups as a group of CQI values of each frequency region; and feed back the CQI values corresponding to the first frequency resource group to the transmitting apparatus, so that the transmitting apparatus acquires a maximum CQI value from the CQI values corresponding to the first frequency resource group and configures frequency domain resources for a plurality of subcarriers by dividing the frequency regions according to a number of subcarriers corresponding to the maximum CQI value.

* * * * *

UNITED STATES PATENT AND TRADEMARK OFFICE
CERTIFICATE OF CORRECTION

PATENT NO. : 9,608,792 B2
APPLICATION NO. : 14/599866
DATED : March 28, 2017
INVENTOR(S) : Ma et al.

Page 1 of 1

It is certified that error appears in the above-identified patent and that said Letters Patent is hereby corrected as shown below:

In the Claims

In Column 30, Line 55, Claim 3, delete "grow" and insert --group--.

Signed and Sealed this
Thirty-first Day of October, 2017

Joseph Matal
*Performing the Functions and Duties of the
Under Secretary of Commerce for Intellectual Property and
Director of the United States Patent and Trademark Office*